US008237856B2

(12) United States Patent
Boland et al.

(10) Patent No.: US 8,237,856 B2
(45) Date of Patent: Aug. 7, 2012

(54) TIMESHIFTING VIDEO RECORDING CAMERA

(75) Inventors: Justin Boland, Altadena, CA (US); Romulus Pereira, Saratoga, CA (US); Narayan Mohanran, Sunnyvale, CA (US)

(73) Assignee: Looxcie, Inc., Palo Alto, CA (US)

( * ) Notice: Subject to any disclaimer, the term of this patent is extended or adjusted under 35 U.S.C. 154(b) by 325 days.

(21) Appl. No.: 12/612,980

(22) Filed: Nov. 5, 2009

(65) Prior Publication Data

US 2010/0118150 A1 May 13, 2010

Related U.S. Application Data

(60) Provisional application No. 61/112,666, filed on Nov. 7, 2008.

(51) Int. Cl.
*H04N 5/225* (2006.01)
*H04M 1/05* (2006.01)
(52) U.S. Cl. ............... 348/376; 348/262; 455/575.2
(58) Field of Classification Search ............. 348/262, 348/376; 455/575.2
See application file for complete search history.

(56) References Cited

U.S. PATENT DOCUMENTS

| 3,542,457 | A | 11/1970 | Balding et al. |
|---|---|---|---|
| 4,051,534 | A | 9/1977 | Dukich et al. |
| 4,398,799 | A | 8/1983 | Swift |
| 4,425,586 | A | 1/1984 | Miller |
| 4,516,157 | A | 5/1985 | Campbell |
| 4,797,736 | A | 1/1989 | Kloots et al. |
| 5,091,719 | A | 2/1992 | Beamon |
| 5,189,512 | A | 2/1993 | Cameron et al. |
| 5,886,739 | A | 3/1999 | Winningstad |
| 6,233,389 | B1 | 5/2001 | Barton et al. |
| 6,563,532 | B1 | 5/2003 | Strub et al. |
| 7,271,827 | B2 | 9/2007 | Nister |
| 7,483,485 | B2 | 1/2009 | Winningstad et al. |
| 2001/0012051 | A1* | 8/2001 | Hara et al. ............... 348/14.01 |
| 2004/0130501 | A1* | 7/2004 | Kondo et al. ............... 345/1.1 |
| 2005/0100311 | A1* | 5/2005 | Hohenacker ............... 386/46 |
| 2006/0139475 | A1* | 6/2006 | Esch et al. ............... 348/340 |

(Continued)

FOREIGN PATENT DOCUMENTS

JP 2003204282 7/2003

(Continued)

OTHER PUBLICATIONS

Tessera, "OptiMP Wafer-Level Camera Technology Flyer", www/tessera.com/technologies/imagingandoptics/waferleveloptics.aspx, retrieved on Jun. 22, 2009, (Feb. 2009), 5 pgs.

(Continued)

*Primary Examiner* — Jason Whipkey
(74) *Attorney, Agent, or Firm* — Blakely, Sokoloff, Taylor & Zafman

(57) ABSTRACT

A video recording camera system configured to record video to a non-volatile memory configured as a circular video recording buffer. In an embodiment, the video recording camera system includes a non-volatile storage medium and a processor is configured to manage at least a portion of the non-volatile storage medium as a circular buffer, replacing recorded video data stored in a subset of memory addresses corresponding to an older recorded video frame with the data corresponding to a newer video frame. In further embodiments, clip files may be partitioned from the circular buffer to prevent logical portion of the recorded video from being overwritten upon reaching a capacity of the circular recorded video buffer.

13 Claims, 10 Drawing Sheets

U.S. PATENT DOCUMENTS

| | | |
|---|---|---|
| 2008/0154610 A1 | 6/2008 | Mahlbacher |
| 2008/0266448 A1* | 10/2008 | Reiner et al. .................. 348/376 |
| 2009/0189981 A1 | 7/2009 | Siann et al. |
| 2009/0262205 A1 | 10/2009 | Smith |
| 2010/0109878 A1* | 5/2010 | Desrosiers ................. 340/573.4 |

FOREIGN PATENT DOCUMENTS

| | | |
|---|---|---|
| JP | 2006074671 | 3/2006 |
| KR | 102004002468 | 3/2004 |

OTHER PUBLICATIONS

International Search Report and Written Opinion for Application No. PCT/US2009/063617 dated Jun. 23, 2010 6 pgs.

www.Justodians.org/Stopping_Evil.htm (no posting date found on website, http://www.archive.org/web/web.php generates a date of May 2, 2008), 5 pgs.

Office Action for U.S. Appl. No. 12/612,972 mailed Dec. 5, 2011, 16 pages.

* cited by examiner

TIMESHIFTING VIDEO RECORDING CAMERA

CROSS REFERENCE TO RELATED APPLICATIONS

This application claims the benefit of U.S. Provisional Application No. 61/112,666, filed Nov. 7, 2008, the entire contents of which are hereby incorporated by reference herein.

FIELD OF THE INVENTION

The invention described herein is in the field of portable electronic devices, and more particularly to a video recording headset.

BACKGROUND OF THE INVENTION

Portable or personal video recording (PVR) camera equipment, such as the ubiquitous HandyCam® Camcorder, has been widely available as a consumer electronics item for a number of years. Nonetheless, transport and accessibility limitations heretofore inherent in such equipment has limited personal video recording. Even with continued reductions in the form factor and expense of PVR camera equipment, because existing video recording functionality has not fully integrated with existing technological infrastructure, recordation of video remains far more removed from daily life than many other activities based on consumer electronics, like the wireless/cellular telephone for example.

One issue is that carrying PVR camera equipment, no matter what the size, is relatively cumbersome and significantly limits the activities in which the user recording video may participate. Furthermore, attempts at "hands-free" PVR camera equipment to date have generally resulted in rather cumbersome configurations of discrete components which are impractical for everyday use by the general public.

The temporal limitations of PVR camera equipment of any form factor to date is another issue which has limited the relevance of recorded video. Even if PVR camera equipment is readily accessible to an individual, for example as carried in a user's pocket, interesting but unexpected events are all but missed. For example, a vast number of videos accessible on video sharing websites, such as YouTube.com, are clips of chance events. However, virtually all of those videos suffer the same defect of the recording being initiated about 30 seconds to one minute too late to capture the entire event as it unfolded in real time. Typically, by the time a user realizes that a notable unplanned event is occurring, accesses and positions their PVR camera equipment, much of a non-premeditated event is missed.

SUMMARY

Disclosed herein are embodiments of a video recording camera system configured to record video to a non-volatile memory configured as a circular video recording buffer. In an embodiment, the video recording camera system includes a non-volatile storage medium, wherein the storage medium is coupled to a processor and is to store, locally in the recording camera system, an encoded video data stream as recorded video data. The processor is configured to manage at least a portion of the non-volatile storage medium as a circular buffer and replace recorded video data stored in a subset of memory addresses corresponding to an older recorded video frame with the data corresponding to a newer video frame. In further embodiments, clip files may be partitioned from the circular buffer to prevent logical portion of the recorded video from being overwritten upon reaching a capacity of the circular recorded video buffer.

Disclosed herein are embodiments of a video recording camera system configured to record video from a user's perspective. The camera system having one or more of the features described herein may have various wearable form factors, such as a necklace, broach, arm band, etc. In a preferred embodiment the camera system is a headset which additionally provides an audio relay between the user and a user's handheld communication device, for example, in support of a telecommunication event in which the user's handheld communication device participates, such as a cellular telephone (voice) call. In an embodiment, a wireless video recording camera headset (referred to herein as a "video recording headset") comprises an earpiece through which the headset is to provide an output audio signal; a microphone through which the headset is to receive an input audio signal; an optical sensor through which the headset is to receive an input image signal; a processor coupled to the optical sensor, the processor configured to process the input image signal received from the optical sensor into an encoded video data stream which is typically but not necessarily accompanied by an audio stream; a storage medium, wherein the storage medium is coupled to the processor and is to store, locally in the headset, the encoded video data stream as recorded video data which may or may not include data from an audio stream.

Disclosed herein are embodiments of a method of recording video, comprising: receiving an input image signal from an optical sensor disposed in the wireless headset; recording video data, based on the received input image signal, to a storage medium disposed within the wireless headset; and wirelessly sending a video frame of the recorded video data to the wireless communication handset.

Disclosed herein are embodiments of a communication system including a wireless video recording headset and a wireless communication handset paired with the wireless video recording headset, the wireless communication handset configured to serve as a viewfinder for the wireless video recording headset and/or control operation of the wireless video recording headset.

Disclosed herein are embodiments of a communication system including a wireless communication handset; a wireless video recording headset paired with the wireless communication handset, the wireless video recording headset to record video data and to be controlled over a first wireless communication link with the wireless communication handset; and a video recording data server remote from the wireless communication handset, the video recording data server including a processor to provide third party access to one or more video frames recorded by the wireless video recording headset and stored on a mass storage medium accessible to the video recording data server. In certain embodiments, the video recording data server is to send the one or more video frames to the third party wireless communication handset at a video resolution based on the video resolution identifier. In other embodiments, the video recording data server is to provide third party access to the wireless video recording headset control functions of the wireless communication handset through a wireless communication link between the wireless communication handset and a wireless telephony base station.

BRIEF DESCRIPTION OF THE DRAWINGS

Embodiments of the invention are particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

Figure 1:
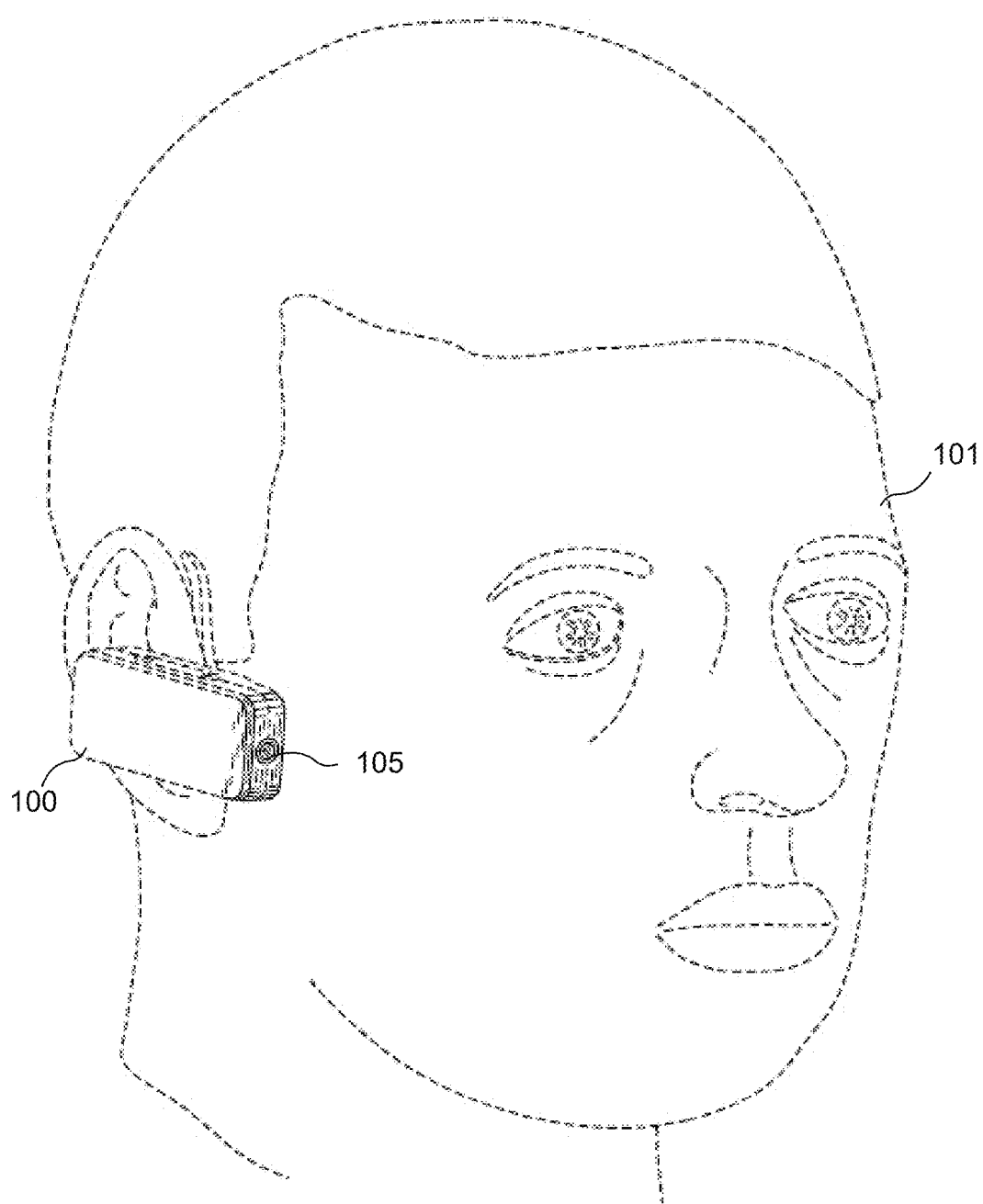
FIG. 1 depicts a wireless video recording headset positioned for use by a user, in accordance with an embodiment of the present invention.

For clarity of illustration, elements illustrated in the figures have not necessarily been drawn to scale. For example, the dimensions of some of the elements may be exaggerated relative to other elements. Further, where considered appropriate, reference numerals have been repeated among the figures to indicate corresponding or analogous elements.

DETAILED DESCRIPTION

Disclosed herein are embodiments of a video recording camera system configured to record video to a non-volatile memory configured as a circular video recording buffer. In the following detailed description, numerous specific details are set forth in order to provide a thorough understanding of embodiments of the invention. However, it will be understood by those skilled in the art that other embodiments may be practiced without these specific details. In other instances, well-known methods, procedures, components and circuits have not been described in detail so as not to obscure the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of actions or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated or otherwise as apparent from the following discussion, it is appreciated that throughout the description, discussions utilizing terms such as "processing", "computing", "converting", "reconciling", "determining" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the present invention may include apparatuses for performing the operations herein. An apparatus may include programmable logic circuitry selectively activated or reconfigured by a program stored in the device. Such a program may be stored on a computer readable storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The terms "coupled" and "connected," along with their derivatives, may be used herein to describe structural relationships between components of the apparatus for performing the operations herein. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g., as in a cause an effect relationship).

FIG. 1 depicts a video recording headset 100 positioned on a user's head 101, in accordance with an embodiment of the present invention. In an embodiment, the video recording headset 100 wirelessly relays audio data to and from a wireless communication device, such as a cellular-enabled wireless telephony handheld device or handset (not depicted). The headset 100 further includes a camera lens 105 through which image information is collected. The headset 100 therefore provides the dual function of both hands-free audio services and hands-free video and/or audio recording for a handset paired to the headset 100.

The exemplary video recording headset 100 has a form factor similar to non-video recording (i.e., audio-only) wireless headsets known in the art. In this manner, video recording functionality is discretely integrated into a wearable device having a form factor already accepted in society and already in widespread use. In the exemplary embodiment depicted, the video recording headset 100 is affixed to an ear of the user's head 101 thereby placing an audio speaker earpiece of the video recording headset 100 proximate to an auditory canal of the user's head 101 and further placing the camera lens 105 in a physical position proximate to a user's eyes to capture image data from a forward-looking perspective of the user's head 101. In embodiments, the optical path in the headset 100 is configured to record image data a user (wearer) views.

Figure 2A:
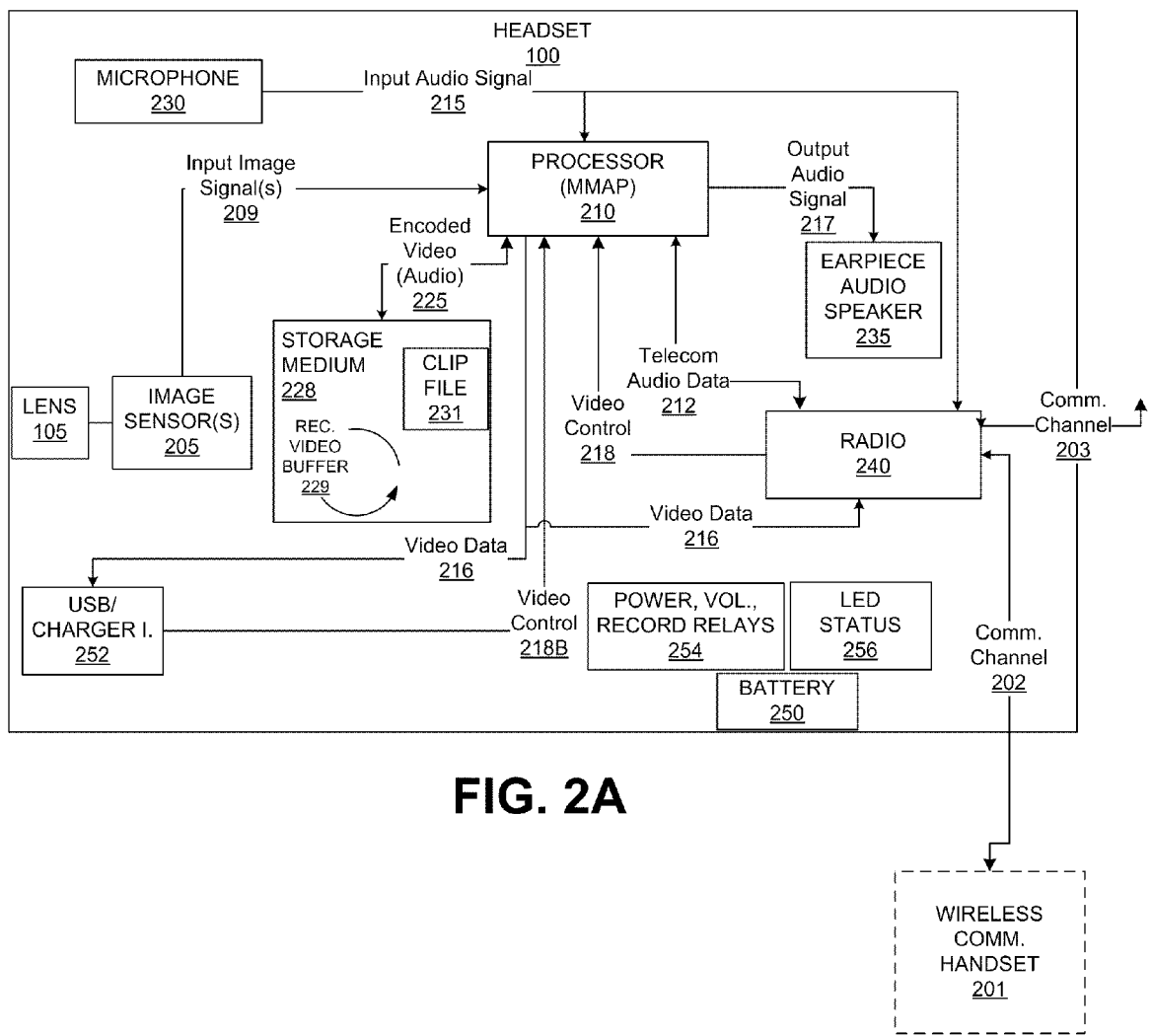
FIG. 2A depicts a functional block diagram of components of a wireless video recording headset, in accordance with an embodiment of the present invention.

FIG. 2A is a functional block diagram of components of a video recording headset 100, in accordance with an embodiment of the present invention. Generally, the headset 100 includes all the components of a conventional audio-only wireless headset, such as an earpiece audio speaker 235 to provide an audible output audio signal 217 and at least one microphone 230 to capture an audible input audio signal 215. The headset 100 further includes a battery 250, a USB/Charger interface 252, power, volume, and video record relays 254 supporting switches disposed on an exterior surface of the headset 100. Additionally, one or more LED status indicators 256 are included in an exemplary embodiment of the headset 100.

The headset 100 further includes video data and audio data (i.e., A/V data) recording components. The microphone 230 may be dedicated to purpose of recording audio data to be combined with recorded video data or the microphone 230 may be shared between personal video recording functions and conventional hands-free telecommunication functions. In the exemplary embodiment, the microphone 230 from is shared by piping the input audio signal 215 from the radio 240 back to the multimedia processor 210 for personal video recording functions. In alternative embodiments however, a separate microphone is utilized for noise cancelling/recording non-telecom audio in conjunction with video recording. For such an embodiment, a voice call would not be recorded on the video/audio stream unless both the separate microphones are enabled. In an exemplary embodiment, the video data recording pipeline includes at least a lens 105 coupled to one or more optical image sensors 205 to provide an input image signal(s) 209 to a processor 210. Processor 210 outputs encoded video data 225 which will typically, but not necessarily, be accompanied by an encoded audio data stream (i.e. A/V data) which is not separately depicted. For economy of the description herein, it is understood that unless specifically indicated to be absent, an audio stream is accompanying a denoted video stream even where the audio stream is not specifically referenced. For example, in certain embodiments described in more detail elsewhere herein, the audio data accompanying the video data 225 may be eliminated such that the video data 225 is recorded to the storage medium 228 without the accompanying audio data.

The headset 100 further includes a storage medium 228 communicatively coupled to the processor 210 (e.g., through a data bus) over which the video data 225 is transferred for storage as recorded video data. The storage medium 228 may be any medium known in the art which offers sufficient storage density to provide minutes to hours of recorded video storage capacity, as a function of the video frame resolution, frame recording rate, and compression algorithms utilized, within the small form factor of a convention wireless headset. In a particular embodiment, the storage medium 228 is non-volatile random access memory (NVRAM), such as NAND flash. In one such embodiment, the NVRAM is provided in the form of a MultiMediaCard (MMC), Secure Digital (SD) card, and the like, which may be removable/swappable from the headset 100 and have gigabyte capacities. In alternative embodiments, the storage medium 228 is in a minidisc (magnetic or optical) format.

The storage medium 228 is to provide non-volatile local storage, within the headset 100, for video data 225 and may also be logically partitioned to further store any one of operating system files, diver files, configuration files, boot loaders, and any other similar operational files. For one embodiment where the storage medium 228 is an MMC, the storage medium 228 is dedicated to the storage of video data 225 and headset operational files are stored in a separate memory, integrated into the processor 210 for example. In an embodiment, the storage medium 228 is configured to provide a non-volatile recorded video data buffer 229. The recorded video data buffer 229 is to store all the video data 225 as it is streamed from processor 210. As such, the recorded video data buffer 229 is the terminus of the video recording pipeline within the headset 100. In an exemplary embodiment, the processor 210 manages and writes to the storage medium 228 in a manner such that the non-volatile recorded video data buffer 229 is a circular buffer whereby upon reaching a capacity of the buffer to store the A/V data 225 as recorded video, the oldest A/V data stored in the recorded video data buffer 229 is over-written by the new A/V data 225 stored to the buffer. Such a circular buffer may be implemented in any manner known in the art which provides a mechanism for mapping storage locations to a time-based logical data sequence so that "oldest" recorded video data is replaced with the "newest" data recorded. For example, a system of pointers may define the current buffer location (e.g., address within the storage medium 228) and may sequentially increment the location in a cyclic nature through the buffer addresses to ensure the current buffer address(es) to be written to next (e.g., with the video data frame most recently streamed from the processor 210) is moved to the location of the oldest stored data or most recently erased buffer location.

In certain embodiments, each frame of video data 225 is associated with metadata assigning a sequential time stamp to the video frame. The time stamp remains sequential even where recording is interrupted and then resumed, with the later video frames associated with time stamps incremented beyond those recorded prior to the interruption. The video data 225 corresponding to each video frame is then stored to the storage medium 228 along with the sequential time stamp. This process continues without loss of any video frame data previously recorded to the recorded video data buffer 229 until the recorded video data buffer 229 reaches a threshold buffer capacity. Upon reaching the capacity threshold, the processor 210 begins to replace the video frame associated with the earliest time stamp with the video frame to be newly recorded to the recorded video data buffer 229. The newly recorded video frame is associated with a later time stamp than the previously recorded video frame (i.e., the time stamp of the oldest video frame is also replaced with a new time stamp). This replacement process may be performed on a frame-by-frame basis or may be performed on a multi-frame basis dependent on at least the storage medium architecture.

In one embodiment where the storage medium 228 is a flash memory and a conventional data streaming protocol is utilized by the processor 210, upon reaching a threshold buffer capacity, the processor 210 erases a subset of the storage locations in the storage medium 228 which store data including the logically oldest streamed video frame (e.g., data marked to correspond to the earliest time stamp). The processor 210 then writes to the erased subset of storage locations data corresponding to the logically newest streamed video frame. Such an alternating "erase old/write new" process may continue iteratively and in an incremental fashion during operation of the headset 100. Depending on the size of the subset of storage locations (e.g., memory sector, memory block, memory page, etc.) erased with each increment, one or more new video data frames may be stored between each memory erase. As one example, the subset of storage locations incrementally erased is equal to one partition of the memory so that a first memory partition containing one or more frames of the logically oldest video data is erased concurrently while one or more frames of the logically newest video data is written to a second memory partition that was previously erased. Before the second memory partition is filled, the first memory partition has completed the erase in preparation for storing new video data output from the processor 210.

In alternative non-flash embodiments, for example where the storage medium 228 is a non-volatile memory such as phase change memory (PCM) or another memory type supporting cell-level reprogramming, memory addresses may be sequentially incremented when the capacity threshold of the recorded video data buffer 229 is reached, the memory addresses storing the oldest video frame are reprogrammed to store the most recently received video frame. Alternatively, a map between memory addresses and the sequenced video frames of the A/V data 225 is updated and when the capacity threshold of the recorded video data buffer 229 is reached, the memory addresses storing the oldest video frame are reprogrammed to store the most recently received video frame.

Depending on the capacity of storage medium 228 and the stream rate of the video data 225, the recorded video data buffer 229 may store anywhere from minutes to many hours of recorded video data. As an example, with MPEG-4 compression, a 4 GB NVRAM is sufficient to store at least one hour of VGA video frames recorded at 30 frames/sec.

The recorded video data buffer 229 enables the video recording headset 100 to be in a continuous video recording mode, cycling recently recorded video through the buffer. In this manner the headset 100 may be operated in an "always recording" mode to advantageously leverage the location of the lens 105 when the headset 100 is worn by a user in a ready position for the additional purpose of relaying the audio data 212 associated with telecommunication event performed by the wireless communication handset 201. It should also be appreciated that even though the recorded video data buffer 229 is non-volatile buffer (e.g., provided by the storage medium 228) in the preferred embodiments, a volatile memory buffer (e.g., SRAM or DRAM) may also be utilized for the recorded video data buffer 229. In such alternative embodiments, the size of the volatile memory buffer is still to be sufficient to store at least one hour of VGA video frames recorded at 30 frames/sec (as to be distinguished from a significantly smaller volatile-cache buffers that might be used to prevent over and under runs during video streaming).

In an embodiment, the storage medium 228 further includes storage for video clip file 231. A clip file 231 is a logical segment of recorded video which has been extracted or logically partitioned from the recorded video data buffer 229. The clip file 231 may be stored within a section of the storage medium 228 managed under a file system, such as a flash file system. In one such embodiment, the storage medium 228 includes a first NVRAM chip configured as the recorded video data buffer 229 and a second NVRAM chip configured as clip file storage. In alternative embodiment, the data recorded to the video data buffer 229 is stored to a first logical portion of the storage medium 228 and the clip file 231 is stored in a second logical partition of the storage medium 228. In this situation, when a logical segment of video stored in the recorded video data buffer 229 is identified as a clip file 231, the logical portion of the memory storing that logical video segment is associated with a clip file name and protected from being overwritten by new video data recorded to the recorded video data buffer 229. As such, the capacity of the recorded video data buffer 229 may be dynamically allocated from the storage medium 228, the buffer becoming smaller (i.e., buffered video data is more frequently over written) with each clip file 231 saved off of the recorded video data buffer 229. Logical partitioning of the clip file 231 in this manner advantageously eliminates the overhead of reading out and rewriting logical segments of recorded video as part of saving a clip file 231 off of the recorded video data buffer 229.

The recorded video data buffer 229 coupled with the ability to save clip files 231 off the recorded video data buffer 229 provide a time-shifting or time-warping capability atypical of camcorders or other personal video recording cameras. This time-shifting capability brings a digital video recording (DVR)-like capability to the video recording camera. For example, in one embodiment, where the video recording headset 100 is recording video essentially at all times while the communication link between the headset 100 and wireless communication handset 201 is active, non-premeditated events incidentally witnessed by the user wearing the headset 100 will be recorded to the video buffer. The video buffer may then be accessed sometime thereafter and a video clip file created to include the logical segment of the recorded video buffer which completely captures the non-premeditated event. In essence, the "always live" recording capability enables one to go back in recorded time and produce a video clip as if a record button on the camera was turned on just in time to capture any event.

In an alternate embodiment, the headset 100 may bypass the storage medium 228 and instead, wirelessly transmit captured video and/or audio data to storage media contained in the wireless communication handset 201. For example, video and/or audio data may be transmitted by the radio 240 as the video data 225 is streamed from the processor 210. Where the radio 240 has a data rate less than half of the video recording pipeline (e.g., Bluetooth compliant embodiments), the headset 100 may utilize the storage medium 228 or volatile memory to buffer the video data 225 during transmission to the handset 201.

The processor 210 processes the input image signal 209 for output as digitally encoded image data stream (i.e., a video data stream) denoted in FIG. 2A as video data 225. video data 225 may also be compressed using any known data compression technique. Electronic video compression techniques enable low-frame rate video transfer via Bluetooth protocols. In an embodiment, the processor 210 compresses the input image signal 209 into digitally encoded video data with a lossy compression algorithm providing significantly greater than 10:1 compression. In one such embodiment, a Moving Pictures Experts Group (MPEG) 4 compliant CODEC is utilized by processor 210.

In an embodiment, the processor 210 is to provide video data 216 to radio 240 for wireless transmission of the image data traffic over the communication channel 202 to the wireless communication handset 201 or over the communication channel 203 to a wireless base station. The processor 210 may also digitally encode the input and output audio signals to/from the audio data 212 communicated via the radio 240. In an exemplary embodiment where the video recording headset 100 employs a Bluetooth compliant communication channel 202 over which mono-aural audio data is relayed, the video data 216 is transmitted over that same Bluetooth compliant communication channel 202. Video data 216 may include any portion of the video data recorded to the storage medium 228. In particular embodiments, video data 216 includes frames of recorded video accessed from the circular recorded video data buffer 229. In one embodiment where the recorded video data is compressed by Moving Pictures Experts Group (MPEG) 4 compliant CODEC, the video data 216 includes intra coded video frames (I-frames). In other embodiments, video data 216 includes an entire logical segment of recorded video saved as the video clip file 231, which may be seconds or minutes long in duration, for example. In such an embodiment, the Video data 216 may include I-frames, B-frames, or P-frames.

In an embodiment, the processor 210 is to further receive control commands, such as video control commands 218, from the radio 240 for wireless reception of video control command traffic over the communication channel 202 as sent from the wireless communication handset 201. Video control commands 218 include any number of commands which control and/or configure the video recording capabilities of the video recording headset 100. In the depicted embodiment, the same communication channel 202 for conducting audio data 212 (e.g., in support of a call to/from the wireless communication handset 201) is extended to further conduct both video data 216, as recorded by the headset 100, and video control commands 218, received by the headset 100. In alternate embodiments however, additional channels may be provisioned and separately utilized for transmission of the video data 216 and/or video control commands 218.

The radio 240 relays audio data 212 over communication channel 202 to a wireless communication handset 201 in support of telecommunication events conducted by the wireless communication handset 201 (e.g., calls received or placed by the handset 201). The radio 240 also transmits the video data 216 and receives the video control commands 218, for example over the communication channels 202 and/or 203. The radio 240 may be any conventional personal area network (PAN) transceiver, such as, but not limited to, a Bluetooth wireless (e.g., IEEE 802.15.1) and/or Wi-Fi (e.g., IEEE 802.11x) compliant radio, and/or ZigBee (e.g., IEEE 802.15.4-2003). In particular Bluetooth embodiments, radio 240 may be provided as a component in the BC04 or BC05 module commercially available from Cambridge Silicon Radio (CSR) of Cambridge, England, as an example. The radio 240 may be connected to the processor 210 via a universal asynchronous receiver/transmitter (UART), for example at 930K.

While the wireless communication handset 201 will typically include a small FIFO buffer, the handset 201 or headset 100 may still lose data bytes over the communication channel 202. For this reason, the communication path may include packet framing over UART (Star/End framing), CRC and ACK for command and control packets (e.g., video control commands 218). The ACK may be in the form of a response which will contain the results of the command. Communication of the audio data 212 and the video data 216 packets may or may not include CRC.

Processor 210 may be implemented as one or more microcontrollers and/or digital signal processors (DSP) and one or more of the functions described to be performed by processor 210 may be performed by any one of those microcontrollers and/or DSPs integrated in any number of configurations, for example as a system on a chip (SOC). Generally, the processor 210 is a low power device (e.g., ARM or AVR processor) configured to control the video data from the imaging pipeline and convert it to a compressed format that can be recorded to the storage medium 228. The processor 210 may further be configured to control the data from the microphone to synchronize recorded audio data with recorded video data and/or switch the input audio signal 215 to be output by the radio 240 as the audio data 212 or output to the storage medium 228 as a component associated with the video data 225, as further described elsewhere herein.

Figure 2B:
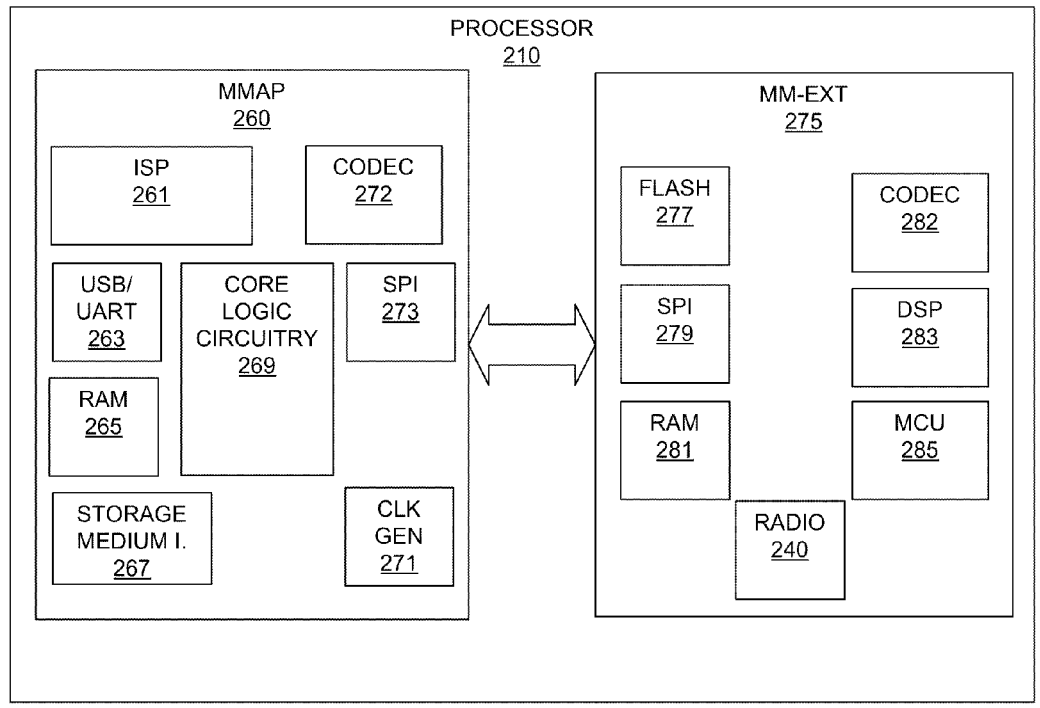
FIG. 2B depicts a functional block diagram of a processor of the wireless video recording headset depicted in FIG. 2A, in accordance with an embodiment of the present invention.

FIG. 2B illustrates a functional block diagram of the processor 210, in accordance with one exemplary embodiment of the present invention. As shown the functionality of the processor 210 is provided by a multi-media application processor (MMAP) 260, such as the CL9020 chip, commercially available from Corelogic, Inc. optionally paired with a multi-media extension (MM-EXT) 275, such as the W99702G chip, commercially available from Winbond, Inc. or the PAP1302BM chip, commercially available from Pixart, Inc. It will be appreciated however, that various functionalities may be incorporated into any number of different application processing platforms and the present invention is not limited in this respect. The exemplary MMAP 260 includes at least one image signal processor (ISP) 261 to which the input image signal 209 is coupled. Any ISP known in the art may be employed as ISP 261. MMAP 260 further includes CODEC 272 to perform compression and/or decompression of video data 216. Alternatively, core logic circuitry 269 may execute software to perform known compression/decompression algorithms. MMAP 260 includes a clock generator 271, platform support for USB/UART communication via USB/UART chip 263, RAM 265, and storage medium interface 267 through which the MMAP 260 may interface with the storage medium 228. MMAP 260 also includes core logic circuitry 269 capable executing one or more of the processing functions described herein and a serial peripheral interface bus (SPI) 273 through which the MMAP 260 may be coupled to the MM-EXT 275.

In the exemplary embodiment depicted, MM-EXT 275 is integrated with the wireless radio 240 as well as one or more the digital processing functions of the processor 210. MM-EXT 275 further includes CODEC 282 to perform compression and/or decompression of the audio data 212. DSP 283 is to perform various ADC/DAC of the audio data 212 and/or video data 216. MM-EXT 275 further includes RAM 281, NVRAM (flash) 277, SPI 279, and a microcontroller unit (MCU) 285 providing logic circuitry to execute any one of the functions described herein.

Headset software may be executable out of RAM 281 and a boot-loader may load a real-time operating system (RTOS) from NVRAM 277 into RAM 281 before the RTOS gains control. The operating system supported on the microcontroller may be any conventional platform, such as the Embedded Configurable Operating System (ECOS). Depending on the embodiment, the OS may provide any of the following: UART to Bluetooth Module control; clocking functions; memory management (e.g., a flash file system or a handling of a set of limited files); media data format conversions (e.g., MPEG-4, H.264 to lower frame rates); library and codec functions (e.g., ffineg); interfacing the microphone 230; and multi-threading to enable the applications described herein; as well as any other conventional operating system function, such as error handling.

In an embodiment, the headset 100 includes application software, which may be configured as a set of multiple modules, which provides instructions and/or algorithms executed by the processor 210 (e.g., MMAP 260 and/or MM-EXT 275) to communicate via the radio 240; interface to the storage medium 228 (flash file system) to record, access or manage video and/or audio data stored on the storage medium 228; provide directory services for stored video and/or audio data (e.g., with time stamp, file size or other metadata); communicate with the handset 201 to obtain a time-of-day, phone number, geolocation data discovered by phone, or other external reference which may be incorporated into the A/V file and updated during video capture; or interface with an application of handset 201. In an exemplary embodiment, Application software manages execution of video control commands 218 received from a handset application to: start recording a video clip, stop recording a video clip; list clips stored (which may include the first frame of the clip); download frames from the recorded video data buffer 229 to the handheld device in a preview format (e.g., down-convert a single I-frame, or down-convert to 4 frames/sec); use preview format frames to define a clip from the circular buffer, which prevents that part of the buffer from being overwritten; download a full/partial video clip file 231 to the handset 201 at a predetermined resolution (which may be lower than the recorded resolution); download a full rate video frames from the recorded video data buffer 229 to a wireless enabled device (e.g., a WiFi-enabled device) at a predetermined resolution; and provide device management information (e.g., status queries and reports regarding availability or video and/or audio portion of the headset 100 or charge level of battery 250).

Figure 2C:
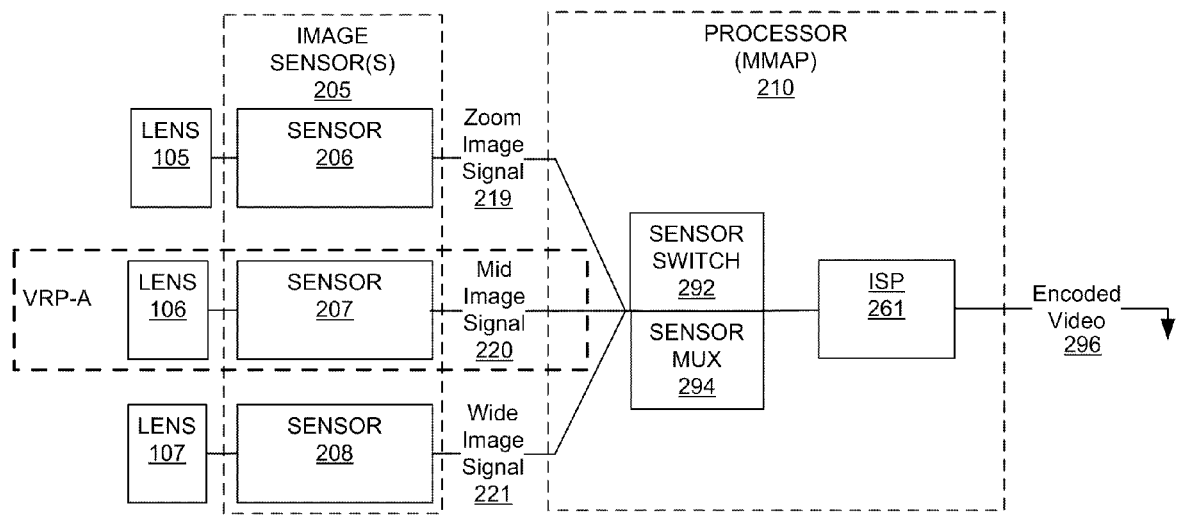
FIG. 2C depicts a function block diagram of components in a video data collection pipeline of the wireless video recording headset depicted in FIG. 2A, in accordance with an embodiment of the present invention.

FIG. 2C depicts a functional block diagram of video data collection components in the video recording pipeline (VRP) of the video recording headset 100, in accordance with an exemplary embodiment of the present invention. One or more of these video data collection components may be powered down by the processor 210 in response a determination the battery 250 has a low charge level so that the wireless transceiver may remain operable to relay the input and output audio signals between the headset and a wireless communication handset 201. Generally, the headset 100 includes an imager comprising the lens 105 and the image sensor 205, such as a charge coupled device (CCD) or CMOS image sensor to form an image circle, for example of approximately 3 mm. In a particular embodiment, VGA design and lens quality is utilized, although any imager resolution may be utilized in alternative embodiments, as a matter of design choice. In the exemplary embodiment shown, a parallel VRP is utilized in which the headset 100 includes a lens 106 and a lens 107 in parallel with the lens 105. In an alternate embodiment, the parallel VRP is simplified to include a single video recording pipeline, such as that highlighted as VRP-A. The material for the lens 105 may be the same for lens 106 and 107, such as acrylic (PMMA) and/or polycarbonate and may be molded as a single piece, (e.g., monolithic). In one embodiment, a conventional cell phone camera chip and injection molded lens is utilized.

In one multi-lens embodiment, each lens is coupled in parallel to a separate image sensor array of the image sensor 205 (e.g., sensor array 206, sensor array 207 and sensor array 208). In one VGA embodiment, each sensor array 206, 207 and 208 is a 640×480 array of CMOS sensors that have pixel separation of approximately 3.6 microns. Electronic Image Stabilization utilizing the dark space of the focal plane array of any of the sensor arrays 206-208 may also be utilized in any fashion known in the art. The image sensor arrays 206, 207 and 208 may be disposed on a same board coupled to the processor 210 via a flexible circuit board. In one such embodiment, the plurality of parallel lens/imager pairs is to provide a switched optical zoom capability in the headset 100. As illustrated, the image sensor array 206 is connected to the lens 105 to provide a first fixed focal length to output a zoom image signal 219, with a 20 degree field of view (FOV) for example. The image sensor array 208 is connected to lens 107 to provide a second fixed focal length to output a wide angle image signal 221, with an 80, 90, or 100 degree FOV, for example. The image sensor array 207 is connected to lens 106 to provide a third fixed focal length to output a mid angle image signal 220, with a 60 degree FOV, for example. The three lenses may, in combination, provide for at least a $5^x$ optical zoom range ($+/-2.5^x$) with a variable resolution (narrow FOV has high resolution for embodiments where the sensor arrays 206-208 have the same cell count). In one exemplary 3-channel embodiment, the wide angle lens 105 has a focal length of approximately 1.3 mm and the zoom lens 107 has a focal length of greater than 8 mm, each with an Fnumber of 2.7.

The multiple imaging channels allow for the three channels to be switched (e.g., zoom command selects an image sensor array 206-208) to provide optical zoom in contrast to a convention single movable lens arrangement which would require an optical path that is disadvantageously long for a small headset form factor. Each image signal channel may be independently focused or focused in unison, depending on the optical path/elements employed to provide a range of depth of field (DOF) over the range of FOV. A digital zoom may also be utilized between the fixed optical FOV to provide a smooth transition in video recorded as the optical zoom is switched between the fixed focal length channels. In certain embodiments, one or more of the lenses 105-107 may be disposed on a boom extending from a main body of the headset 100 to allow for an extended optical path conducive to optical zooms of at least 10× or for large fields of view where the front element needs to be located in a position where the environment does not obstruct the field of view.

As depicted in FIG. 2C, each image signal 219-221 is coupled to a same image signal processor (ISP) 261 In other multi-lens embodiments, however, the parallel VRP may alternatively include a plurality of ISPs, with a separate ISP coupled to each image signal 219-221. For multi-lens embodiments, the processor 210 includes a sensor switch 292 to switch between the image signals 219, 220 and 221 and multiplexer 294 to multiplex the image signals 219, 220 and 221. In one embodiment, the processor 210 is to switch, in response to receiving a video control command 218, between the wide angle image signal 221 and the zoom image signal 219 to output an encoded video stream 296 at only at a particular zoom to be stored to the storage medium 228. In an alternative embodiment, video data is captured at the different FOV simultaneously. In one such embodiment, the sensor multiplexer 294 outputs the encoded video stream 296 as a time division multiplexed (TDM) data stream to be stored to the storage medium 228. Recorded frames may be interleaved between the plurality of image capturing channels. Recorded video may then be saved off as a video clip file 231 at any of the plurality of DOF/FOV to allow for space shifting the video clip file. For example, in one embodiment, processor 210 is to demultiplex the multiplexed video data recorded from the storage medium 228, in response to receiving a video control command 218 selecting a zoom to partition, as a video clip file, a logical segment of the stored video data. As such, the DOF and FOV of video recorded to the recorded video data buffer 229 is not necessarily set as it is in conventional video recording cameras and instead a desired DOF and FOV may be selected during a video clip definition process rather than, or in addition to, during a video capture process. For embodiments where the video data is captured at the different FOV simultaneously, a single image stream may also be assembled from all three image capture channels with the three different planes of focus to provide images having a depth of field exceeding that of any one of the lenses 105-107.

Figure 3A:
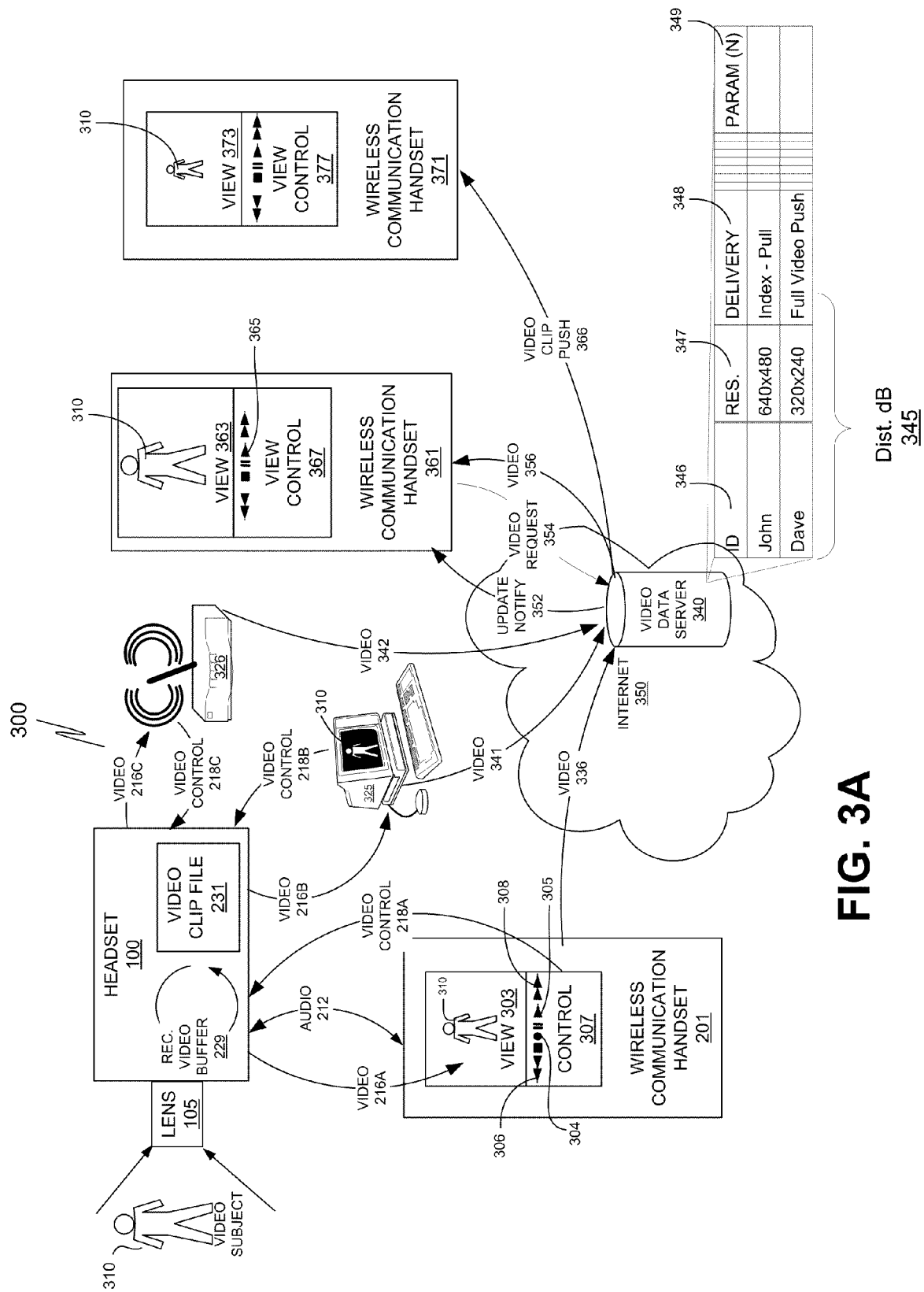
FIG. 3A depicts a communication system including a wireless video recording headset in communication with a wireless communication handset and sharing video recorded by the headset with a remote video data server, in accordance with an embodiment of the present invention.

FIG. 3A depicts a communication system 300 including the video recording headset 100 in communication with a wireless communication handset 201. In the embodiment depicted, the video recording headset 100 senses image signals of video subject 310 through the lens 105, the image signals are then processed (e.g., digitized, compressed, etc.) and stored as video data to a storage medium disposed within the headset 100. The headset 100 links or pairs with the wireless communication handset 201 in a peering mode or headset/handset mode. The wireless communication handset 201 device is generally a handheld communication device having view screen 303. The view screen 303 is to serve as a viewfinder for the headset 100 and may further provide for previewing of video recorded by the headset 100. The handset 201 will typically also include a wireless radio transceiver of relatively higher power than that of the headset 100. An exemplary wireless communication handset 201 is a cellular subscriber unit (i.e., cell phone), such as a Blackberry® Smartphone commercially available through Research In Motion (RIM) of Ontario, Canada, Iphone® commercially available through Apple, Inc. of Cupertino, Calif., and the like.

As illustrated, the video recording headset 100 interacts with wireless communication handset 201 beyond providing a wireless two-way relaying of the audio data 212 to further wirelessly transmit the video data 216 to the wireless communication handset 201 for viewing and/or forwarding via a data service plan provided by a handset subscription plan. The headset 100 further wirelessly receives control commands, such as the video control commands 218, from the wireless communication handset 201. Generally, the handset 201 is configured to: start or stop headset video recording; create a video clip file 231; display a listing of video clip files stored on the headset 100; preview a selected video clip file 231 (e.g., at a lower frame-rate than recorded); upload a selected video clip file 231 to a remote data repository; initiate or halt a live video feed from the headset to an internet connection; delete a video clip file 231; configure the headset video capture parameters (e.g., recording rates and levels, image formats, zooms; etc); and edit previously recorded video clip files.

The wireless communication handset 201 includes application software executed on the handset 201, which may be configured as a set of multiple modules including a custom data communication driver with which one or more of the video data 216 and video control commands 218 may be transferred with the headset 100 over the communication channel 202. The communication profiles supported may include an audio headset profile over Sychronous Connection Oriented Link (SCO) and object Push protocol (over ACL—used by vCard applications). In certain embodiments, RFCOMM/SPP in a handheld device is utilized to provide dial-up networking (DUN) profiles. In such an embodiment a DUN profile is utilized for communication between the PVR headset and a handheld device. In a further embodiment, Logical Link Control and Adaptation Protocol (L2CAP) layer is utilized to connect the PVR headset to the handheld device (on a proprietary protocol). Any such protocol may provide semi-lossless transport capabilities such that an occasional data packet (e.g., video data) may be dropped, but a control/command packet is not. The protocol definition may provide for a system of ACK and retransmission of commands (and potentially the responses by remembering the last command). The ACK can be in the form of a response to the command/control packet. In one embodiment, there is only one outstanding request at a time.

Because the video data 216 may be transmitted to the wireless communication handset 201, the wireless communication handset 201 may be integrated with headset 100 as the user's video recorder control interface with the view screen 303 serving as a preview screen or a "view finder" similar to a conventional video recorder. For example, as depicted, a frame containing the video subject 310, as recorded by the headset 100, and transmitted as video data 216, is displayed in the view screen 303. This bifurcation of the video recorder camera pickup and the video recorder controller allows the video recording headset 100 to retain a form factor of a conventional audio-only headset and leverages the existing technological infrastructure (e.g., data service connectivity, video display and processing, etc.) provided by the handset 201. As such, the present invention enables a video recording camera to integrate unobtrusively into the daily life of a user by providing the new functionality of video recording without the introducing a separate electronic device platform.

In other embodiments, the relays 254 (FIG. 2A) provide direct access to video recording operations of the headset 100 in a "stand-alone" mode whereby the video recording operations described herein may be performed without the handset 201. For such stand-alone embodiments, a user of the headset 100 can actuate the relays 254 (e.g., via buttons present on an external surface of the headset) to activate/deactivate video recording, create a video clip 231, or change a FOV, for example. Other video control commands 218 described herein in the context being issued from the handset 201 may be analogously provided for stand-alone operation. Of course, in stand-alone embodiments, the additional functionality provided by the handset 100 (e.g., viewfinder) is not available.

In embodiments, video and/or audio recording may be initiated or terminated from the headset 100 or the handheld device (handset 201) via video control commands 218. Video control commands 218 include any number of commands which control and/or configure the video recording capabilities of the video recording headset 100. Generally, any command employed in a conventional digital video recorder may be included in the video control commands 218, such as, but not limited to, "record on/off," toggling the video recorder from a recording state to a non-recording state. In one embodiment, video control commands 218 are issued by the wireless communication handset 201 in response to the handset 201 receiving a handset user's selection of such a command via a handset user interface. In the embodiment depicted in FIG. 3A, video control soft keys 307 provide a handset user video control interface. Video control soft keys 307 include a "record" button 304 which cause the handset 201 to send a "record" command, causing the headset 100 to enter a video recording state.

Figure 4:
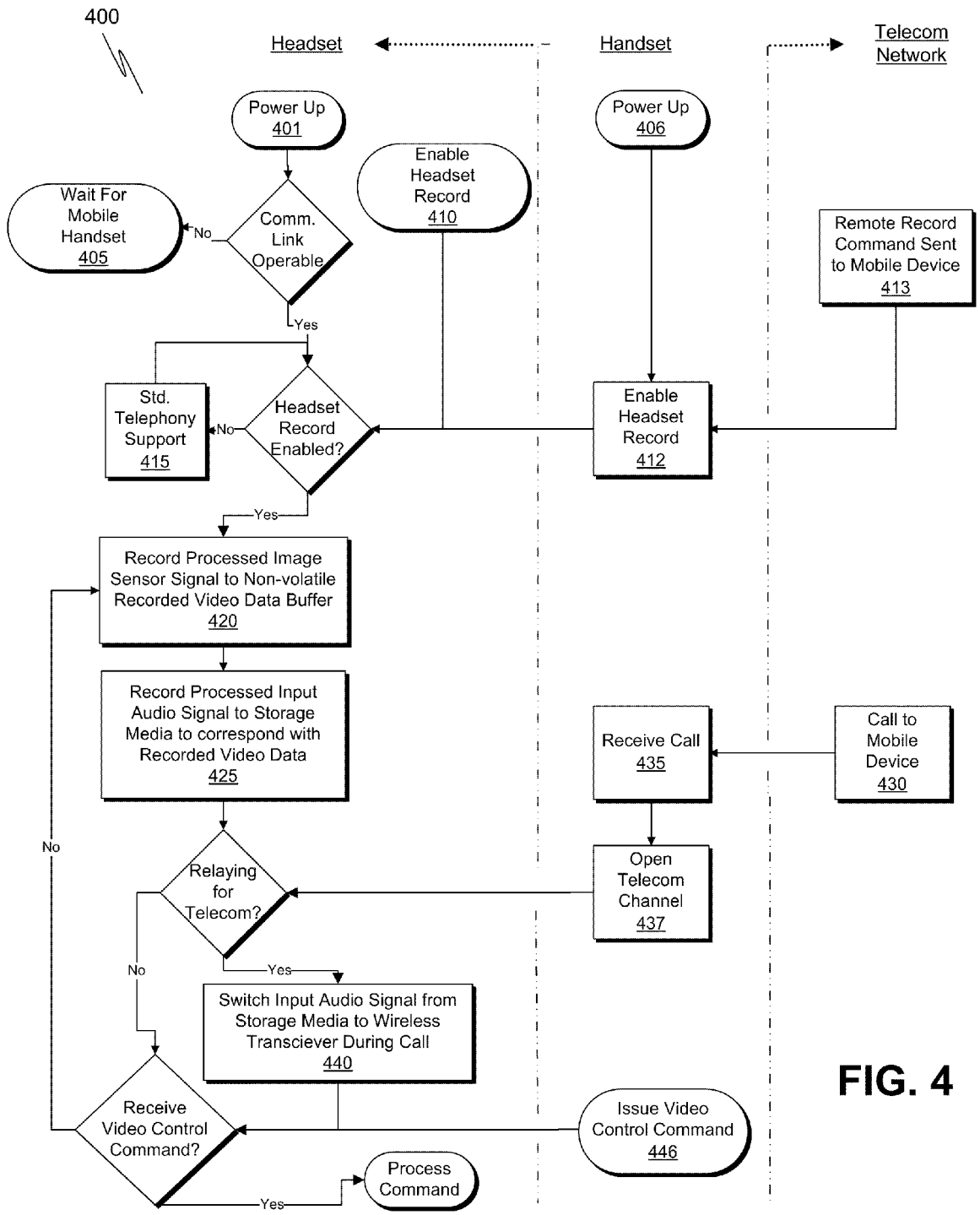
FIG. 4 depicts a flow diagram illustrating interactions of a wireless video recording headset in communication with a wireless communication handset and a cellular telecom network, in accordance with an embodiment of the present invention.

FIG. 4 depicts a flow diagram illustrating a video record enable algorithm 400 for a wireless video recording headset, such as headset 100, in communication with a wireless communication handset, such as handset 201, connected to a cellular telecom network. The video record enable algorithm 400 begins with the headset powering up at operation 401. Upon powering up, the headset determines if a paired mobile handset is communicatively linked and, if not, waits at operation 405 for a wireless communication link with the mobile handset to be established (e.g. when the handset powers up at operation 406). While the communication link with the mobile handset is active, the headset provides auditory relay as a conventional wireless telephony headset at operation 415. In the embodiment depicted in FIG. 4, and further illustrated in the timing diagram of FIG. 5, the headset video recording pipeline is powered up in response to a headset record enable command initiated locally on the headset at operation 410 (e.g., via record relay 254) or received by the headset wirelessly from the handset at operation 412 (e.g., via record button 304). In another embodiment discussed further elsewhere herein, the headset video recording pipeline is powered up in response to the handset 201 receiving a remote video control command via a cellular communication channel to the telecom network at operation 413. In still another embodiment, the headset defaults to a recording state whenever the headset is powered on.

At operation 420, image sensor signal(s) are processed and stored, as a video component of the video data 225, to the non-volatile video buffer (e.g., recorded video data buffer 229). As further depicted in FIG. 4, at operation 425, the input audio signal 215 received from the headset microphone (e.g., microphone 230) is processed as a corresponding audio component of the video data 225. Video control commands 218 may further include a "record mute," command whereby audio that would ordinarily be picked up by the headset microphone and recorded along with video data is not recorded.

Figure 5:
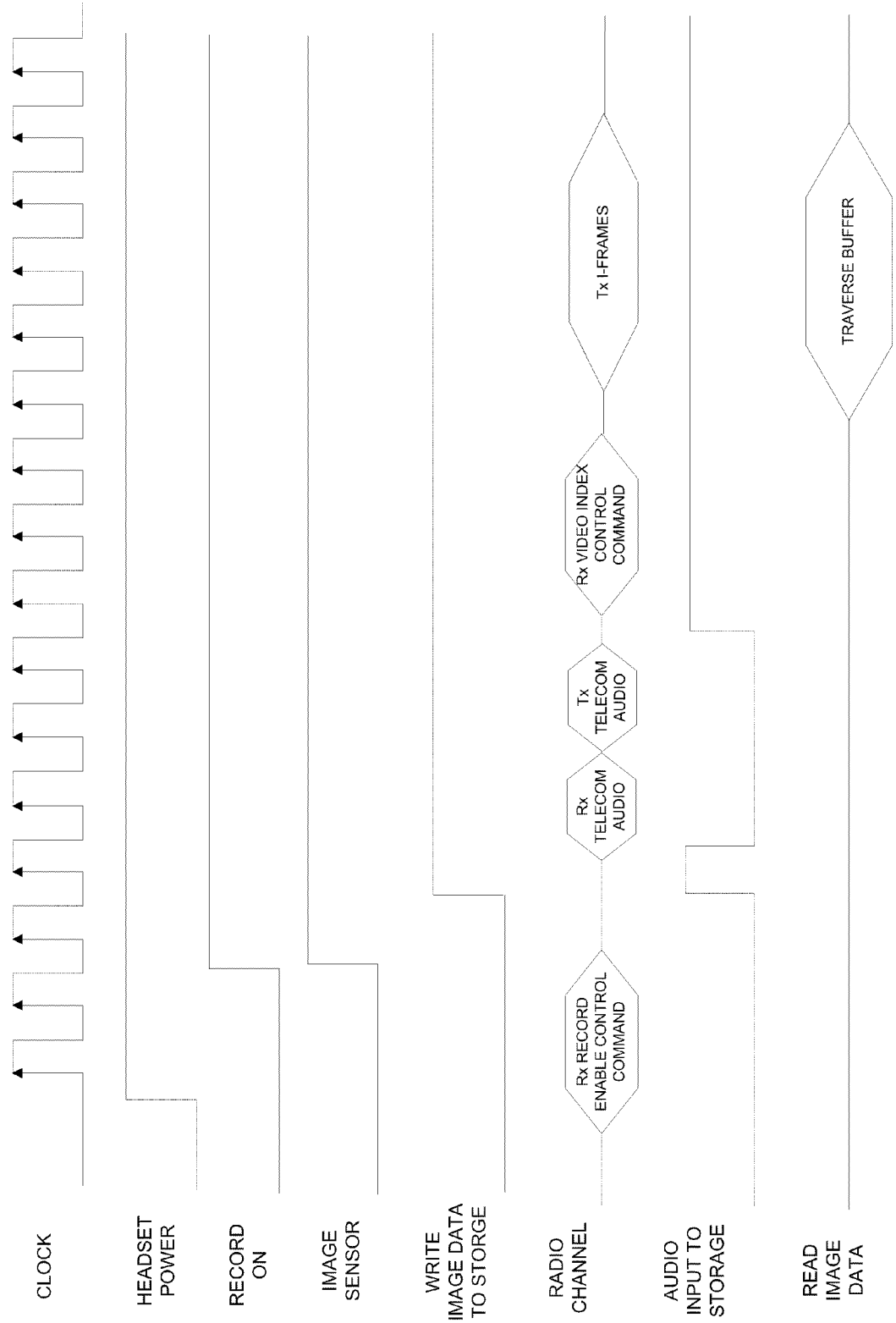
FIG. 5 depicts a timing diagram illustrating relative timing of particular functions of wireless video recording headset in communication with a wireless communication handset.

As depicted in FIG. 4, and further illustrated in the timing diagram of FIG. 5, the recording of data to the headset's recorded video data buffer occurs continuously until the handset participates in a telecommunication event or the headset receives a video control command (e.g., record disable, etc.) from the handset at operation 446. For example, a call to the wireless handset may be initiated in the telecom network at operation 430, the handset receives the call at operation 435 and, at operation 437, the handset opens a wireless communication channel with the headset. In response, at operation 440, the headset (e.g., processor 210) switches the input audio signal 215 from the storage medium 228 to the wireless transceiver to support the telecommunication event. As such, the input audio signal is not recorded along with the video data 225 during the telecommunication event. A user's voice tele-conversation is thereby excluded from the recorded video data buffer while the video data 225 continues to be stored during the telephone call. Upon completion of the call, the input audio signal 215 is switched back to provide an audio stream accompaniment to the video data 225. It should be appreciated that this behavior may be user configurable so that in an alternate embodiment, at operation 440, the headset, rather than switching the input audio signal 215 off during a voice call, instead continues recording the input audio signal 215 along with the output audio signal 217 as an accompaniment to the video data 225 to record both sides of the telephone conversion as part of the A/V data stored to the recorded video data buffer 229. In addition to the "record" command, other video capture related control commands may be issued by the handset to configure the video capture parameters of the headset. For example, the zoom level at which to record video may be set and whether or not multiple lenses are to capture video data simultaneously may be configured using soft keys on the wireless handset 201.

Beyond such video capture related control commands, the video control commands 218 may also include commands to manipulate or edit video data that was previously recorded by the video recording headset 100. The ability to manipulate previously recorded video data with the handset 201 allows important video data to be identified and retained shortly after an event is captured when it is still easily locatable within the recorded video data buffer. This feature also allows the recorded video data buffer 229 to have a relatively small capacity (e.g., overwriting uneventful video data with a single buffer cycle being on the order of one to a few hours).

Figure 6:
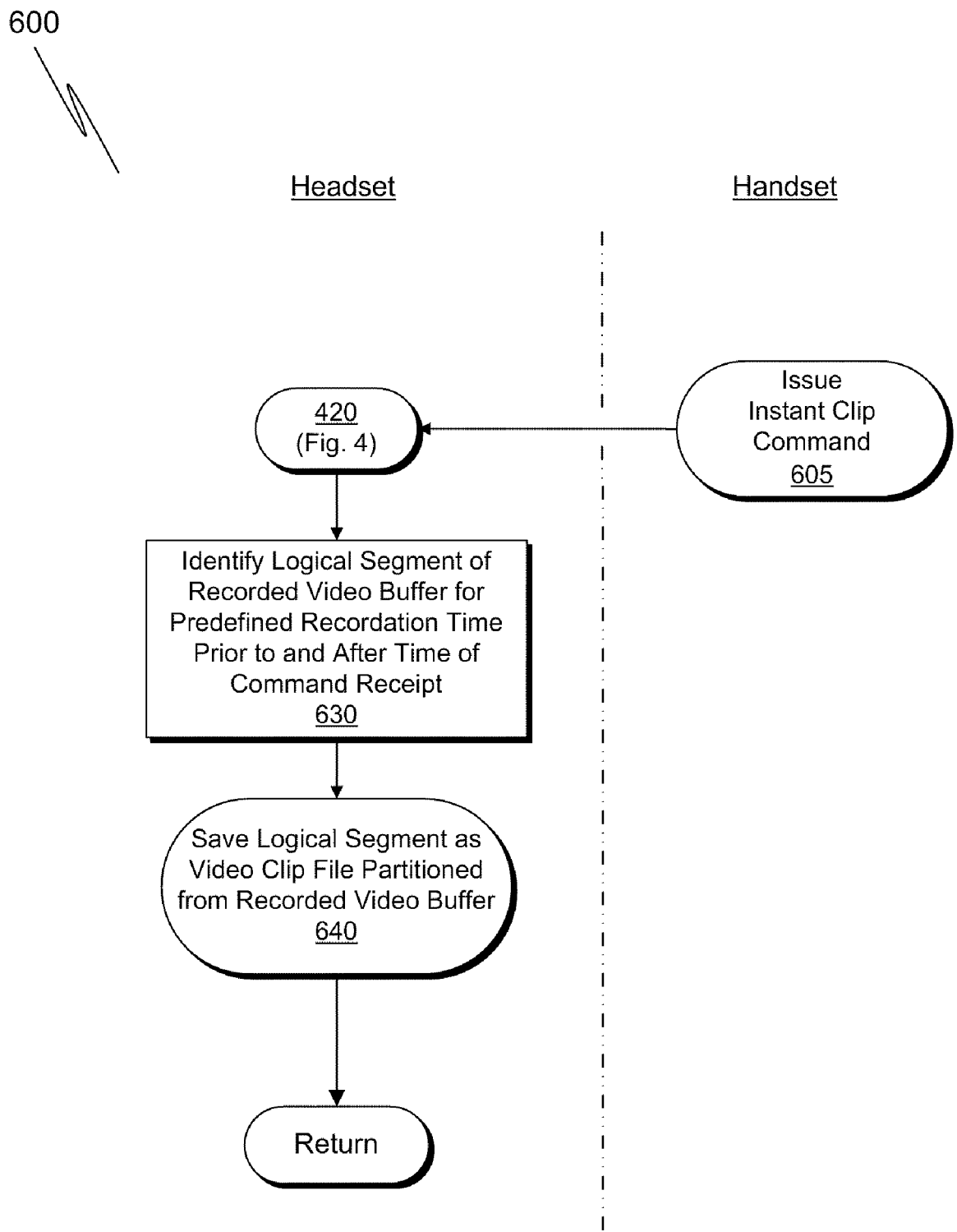
FIG. 6 depicts a flow diagram illustrating recordation of a video clip by a wireless video recording headset as controlled by a wireless communication handset in communication with the wireless video recording headset, in accordance with an embodiment of the present invention.

FIG. 6 depicts a flow diagram illustrating an exemplary video clip file definition method 600 whereby an "instant clip" is extracted or partitioned from the recorded video data buffer 229 and saved as a video data file 231. The video clip file definition method 600 begins with the headset in a video recording state at operation 420 of FIG. 4, although the headset may be in any communicative state. At operation 605, the handset issues the instant clip command to the headset and, in response, at operation 630, the headset identifies a logical segment of recorded video data buffer 229 corresponding to a predetermined video recording time interval prior to and after a reference time. The reference time may be based on the time at which the instant clip command was received or processed by the headset, for example. Assuming the instant clip command defines a reference time t=0, and the predetermined video recording time interval is 30 seconds, the processor 210 will define a starting frame for the video data file 231 as the frame which was recorded to the video data buffer 229 30 seconds prior to the reference time, at a time t=−30 seconds. In further response to receiving the instant clip command, the processor will allow 30 seconds (the predetermined video recording time interval) of video data to be recorded to the video data buffer 229 and define an ending frame for the video data file 231 as the frame which was recorded to the video data buffer 229 30 seconds after the reference time, at a time t=30 seconds. At operation 640, all video data encompassed by the first and second frames becomes a logical video segment saved as the video data file 231 and partitioned from the buffer so that it will not be overwritten during the normal course of the cycling recorded video data through the buffer 229. As illustrated in FIG. 6, the video clip file definition method 600 provides a single command for capturing, as a single video clip file, events that were just witnessed as well as events that may occur in the very near future. With the instant clip command, the headset 100 provides a DVR-like capability whereby a user may access their wireless handset 201 in due course, select a single soft key to trigger the instant clip command and save off a video clip of a previous event which induced or motivated the user to select the instant clip command without missing any portion of the event. The predetermined video recordation time may be user configurable and may be incremented by logical sequences of the video control soft keys. For example, repeated selection of the instant clip soft key may increment the time duration of the video recordation by 30 seconds with each key press to increment the video clip file duration from 1 minute to 2 minutes, etc. Upon completion of the video clip file definition method 600, the headset 100 returns to the previous state.

In a further embodiment, the handset 201 is also used to preview (perhaps in a low resolution format) video data that is stored on the headset 100 either in the non-volatile recorded video data buffer 229 or as a distinct video clip file 231. As depicted in FIG. 3A, video control soft keys 307 include a forward index 308 and backward index 306 which command the headset 100 to traverse through logical segments of the recorded video data buffer 229.

Figure 7:
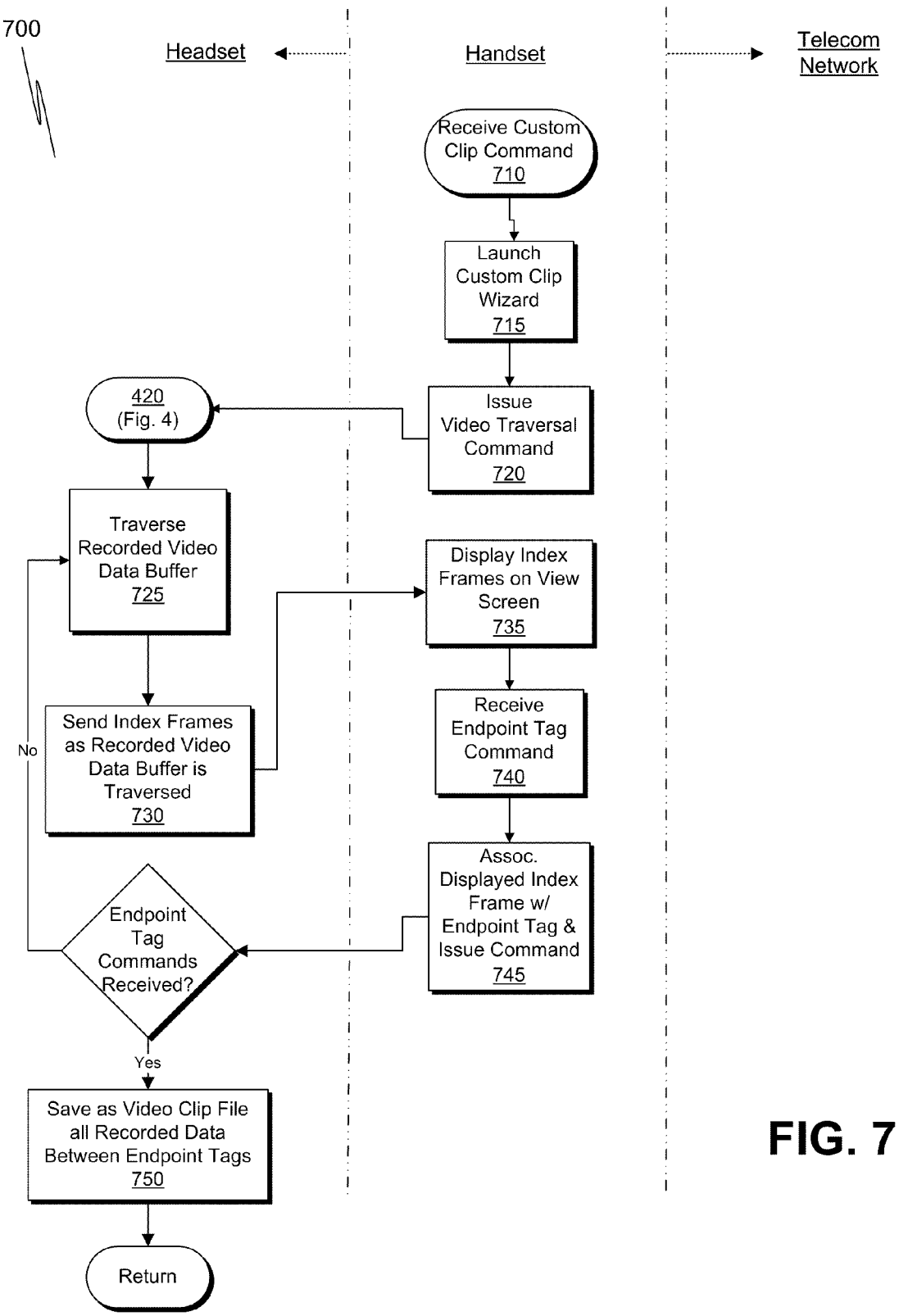
FIG. 7 depicts a flow diagram illustrating recordation of a video clip by a wireless video recording headset as controlled by a wireless communication handset in communication with the wireless video recording headset, in accordance with an embodiment of the present invention.

FIG. 7 further illustrates an exemplary buffer traversal and custom clip definition method 700. At operation 710, the handset receives a custom clip command. For example, a soft key on the handset may be selected by a user which causes a custom clip wizard to be launched at operation 715 which provides additional menu level of soft keys pertaining to definition of a custom video clip. At operation 720, the handset wirelessly issues a video traversal command to the headset. For example, in response to a user selecting the backward index 306, a backward buffer index command is issued to the headset 100. The handset receives the video buffer traversal command, for example while performing operation 420 from FIG. 4, and executes the command at operation 725. Execution of the buffer traversal entails the processor 210 accessing the recorded video data buffer 229 and reading out recorded video data in reverse chronological time. At operation 730, and as further illustrated in the timing diagram of FIG. 5, the headset transmits to the handset video frames for display by the handset at operation 735 (e.g., on the view screen 303). In one embodiment, the processor 210 is configured to transmit, at operation 730, I-frames accessed from the recorded video data buffer 229 as the buffer is traversed to allow the use to visually index through the video data stored in the recorded video data buffer 229.

Traversal continues until, at operation 740, the handset receives an endpoint tag command (e.g., via a user's soft key selection) which is then be associated with a frame (e.g., a first I-frame) displayed by the handset. The handset then issues a video control command at operation 745 which identifies a frame in the recorded video buffer as an endpoint (e.g., a video clip beginning or ending frame). At operation 750, based on one or more of such endpoint tagged frames, a logical segment of the recorded video data buffer 229 is then saved as a video clip file 231. For example, all video data recorded after a beginning tagged frame up (e.g., a first I-frame) to an ending tagged frame (e.g., a second I-frame) may be defined as a logical segment saved as a single video clip file 231. With the custom video clip defined, method 700 returns the headset to the previous state.

In a further embodiment, the video data 216A transferred from the headset 100 to the handset 201 includes the saved video clip file 231. In such an embodiment, the handset 201 may then be used to store and preview (perhaps in a low resolution format having a lower resolution than that recorded) a video clip file that is downloaded from the headset 100. As illustrated in FIG. 3A, video control soft keys 307 further include a "play" button 305 whereby in response to a user's actuation, a video clip file stored on the handset 201 (e.g., as downloaded from the headset 100) will be played on the view screen 303. Audio data from the video clips previewed or displayed on the handheld device may further be relayed back to the headset 100 during playback of the video clip to allow the user to hear the preview through an earpiece of the headset 100.

For embodiments where the wireless connection between the headset 100 and the handset 201 is of sufficient bandwidth (e.g., WiFi), the video data 216A may include video frames streamed from the headset 100 (e.g., as output from the recorded video data buffer 229 or directly from the encoded stream generated by the processor 210 without first creating a clip file 231), which may be viewed and/or recorded to the handset 201 in substantially real time. As such, the video data 216A may include either video data sent as a "live" video feed or a clip file 231 sent as a pre-recorded video feed.

As further depicted in FIG. 3A, video data 216B may be transferred from the headset 100 to a personal computing platform 325. The personal computing platform 325 may be any conventional, desktop, laptop, handheld device known in the art. The primary distinction between the computing platform 325 and the handset 201 being that the computing platform 325 would not be connected to a cellular network like the handset 201. Instead, the computing platform 325 provides internet connectivity via packet-based protocols which may be wireless (e.g., WiFi, WiMax, etc.) or wired (Ethernet, etc.). As such the personal computing platform 325 represents any device which uses the same wireless or wired protocol as the headset 100, can replace the control and/or video preview functionality of the handset 201, and may additionally provide a gateway from which to communicate video data recorded by the headset 100.

The video data 216B may include either video data sent as a clip file 231 or as a live video feed directly from the processor 210 (video stream 225 as it is encoded from the processor 210 or as it is accessed from the recorded video data buffer 229) so that video data recorded by the headset 100, such as recorded video subject 310, may be accessed substantially in real time in the case of a live video feed (where frames are not first designated as part of a clip file 231) or at a later time in the case of sharing a clip file 231. For example, after a number of clip files 231 have been saved off the recorded video data buffer 229, perhaps at the end of a day or week of headset use, one or more video clip file 231 may be downloaded over a communication link to the computing platform 325. As another example, where video data is streamed to the recorded video data buffer 229, the video data is concurrently communicated to the linked computing platform 325 which may then either store the video data to a storage medium off the headset 100 or forward the video data substantially real time over the internet.

In an embodiment, the video data 216B is transferred over a wired communication link, such as a USB connection (e.g., the USB/Charger interface 252), IEEE 1394 connection, or the like. In other embodiments, the video data 216B is transferred over a wireless communication line, such as a Bluetooth connection (e.g., via the communication channels 202 provided by radio 240) or a WiFi connection (e.g., via the communication channels 203 provided by radio 240) to the computing platform 325. For example the headset 100 may pair with the computing platform 325 in a manner similar to that described from the handset 201. Because wired and certain wireless communication modes may provide a faster transfer of the video data 216B than the wireless transfer of video data 216A (e.g., in the case where the handset 201 is Bluetooth enabled but not WiFi enabled), the Video data 216A may be primarily for saving off a video clip file 231 (e.g., as a custom clip) shortly after an event is video recorded. The video clip file 231 is then downloaded as the video data 216B for complete viewing and/or further distribution via the personal computing platform 325. In other embodiments, where the video data 216B comprises frames streamed in real time as they are provided to the recorded video data buffer 229 (e.g., in the case where the handset 201 is WiFi enabled), the headset 100 may support live video conferencing capability or other functions relying on live video feeds (internet-enabled life cam, internet-enabled security cam, etc.). While such live video transmission may utilize the recorded video data buffer 229 to ensure transmission of all video data recorded. It should also be appreciated that the live video transmission may shunt the video data buffer 229 altogether.

For embodiments where the personal computing platform 325 communicates video control commands 218B via a wired communication link (e.g., coupled to the USB/Charger interface 252), the video control commands 218B include any of those described in terms of video control commands 218A. The personal computing platform 325 may provide the same video capture control and video editing/saving control afforded the wireless communication handset 201. For example, the headset recording capability may be enabled or disabled, the recorded video data buffer 229 may be traversed and previewed, and video a clip file 231 generated and downloaded via the video control commands 218B.

As further illustrated in FIG. 3A, video data 216C may also be transferred from the headset 100, over a wireless communication line such as a WiFi connection (e.g., via the communication channel 203 provided by radio 240), to a wireless-enabled network portal device 326. In such embodiments, the network portal device 326 is distinguished from the computing platform 325 in that it provides network connectivity but typically will not provide a headset user an interface by which the headset user can view recorded video or directly issue video control commands. For certain such embodiments, the headset 100 may perform an automated connect process, as known in the art, to establish an IP address from which to stream the video data 216C in a manner substantially as handset 201 might be similarly configured in the art. Because of the hardware functionality contained within the headset 100, an intermediate link to handset 201 is not necessary to connect to an internet network portal device.

The direct headset-to-packet network wireless communication may provide a faster transfer of the video data 216C than the wireless transfer of video data 216A. Therefore, the video data 216A may again be used primarily for saving off a video clip file 231 (e.g., as a custom clip) shortly after an event is video recorded. Subsequently, when in the presence of the network portal device 326 (e.g., WiFi hotspot), the video clip file 231 is downloaded as the video data 216B for further distribution via the wireless-enabled network portal device 326. In other embodiments where the video data 216B comprises video frames streamed in substantially real time as they are recorded, the headset 100 may support live video conferencing capability while in communication with the wireless-enabled network portal device 326. Other functions relying on live video feeds (internet-enabled life cam, internet-enabled security cam, etc.) may similarly be performed via the network portal device 326.

While exemplary embodiments described herein are generally provided in the context of manipulating the video data recorded by the headset 100 or controlling the video recording capabilities of the headset 100, it should be appreciated that the hardware and/or software functionality present in the headset 100 to perform video data storage and transmission, is amenable to the storage and/or transmission of any data. As such, the headset 100 may further communicate non-video data stored on the headset 100 via the wired communication link (e.g., via to the USB/Charger interface 252) or wireless communication links available in the headset 100 (e.g., via communication channels 202 and/or 203). For example, the headset 100 may provide a portion of the recorded video data buffer 229 for a general data storage use. In this capacity the headset 100 may serve as a wireless-enabled and/or USB-enabled "thumb drive" which may provide data file storage and access to one or more of the handset 201, computing platform 325 or the wireless-enabled network portal device 326 (e.g., WiFi hotspot provided by an automobile, airport, restaurant, etc.). As an example of one wireless embodiment, upon establishing a Bluetooth communication link with the computing platform 325, the headset 100 presents a file system for data transfers containing non-video data in a manner similar as is provided for presentation of video clip files 231. Similarly, non-video data received via the handset 201 may also be stored on the headset 100.

Once video data 216A (or non-video data) is stored on the handset 201, the handset 201 may be used to upload the data received from the headset 100 via a wireless telephone base station in a cellular/mobile network or directly to a packet data network such as the internet 350 (e.g., via a wireless connection between handset 201 and wireless-enabled network portal device 326). If the video data was not tagged with metadata provided by the phone as it was recorded by the headset 100, such tagging may be performed by the handset 201 upon storing the video data 216. For example, data fields demarking a time of recording, a location of recording, a phone number of recording handset, etc. may be appended to the video data 216A when stored in the handset 201. As depicted in FIG. 3A, the handset 201 may be utilized to transmit video data 336 to other cellular-enabled handsets directly over a cellular/mobile communication network or the handset 201 may be utilized to transmit video data 336 through the cellular/mobile communication network as a gateway to a packet data network such as the internet 350. Generally, any one-to-one or one-to-many distribution protocol available through the cellular/mobile network or packet data network may be utilized. For example, email, multimedia messaging (MMS), Web-based protocols, and the like known in the art may be used for this purpose.

Similarly, once video data 216B is stored on the personal computing platform 325, the platform 325 may be used to upload the video data, as video data 341, to any destination accessible via the internet 350. Likewise, the wireless-enabled network portal device 326 may be used to upload the video data 216C, as video data 342, to any destination accessible via the internet 350. As such, any of the video data 336, 341 or 342 may provide for real-time (live) video transmission (e.g., streaming of conference calls, etc.) or provide for time-shifted video transmission (e.g., time-shifted streaming, sharing of clip files 231, etc.).

As depicted in FIG. 3A, the video data 336 may be uploaded from the handset 201, computing platform 325, or network portal device 326 to a video data server 340. In one embodiment, the video data server 340 may merely provide mass video data storage remote from the handset 201. In a further embodiment, the video data server 340 includes a processor to provide third party access to one or more video frames the video data 336 stored on a mass storage medium accessible to the processor. In one such embodiment, the video recording data server 340 includes a video distribution database 345 keyed to the wireless communication handset 201 and identifies subscribers to the video data 336. As illustrated, the video distribution database 345 includes a friends list of subscriber IDs 346 and further includes a number of parameters 349 keyed to the subscriber ID 346. A similar distribution process may also be performed for non-video data.

In a particular embodiment, the video distribution database 345 includes a video resolution identifier 347 keyed to the subscriber ID 346 which determines at what resolution the video data 336 is to be communicated from the video data server 340 to the subscriber. This allows the video data 336, which is stored on the video data server 340 at the native resolution recorded by the headset 100 (e.g., VGA) to be down sampled by a processor associated with the video data server 340 and transmitted to the subscriber at a reduced display resolution based on what the subscriber has specified (via the resolution parameter 347). In this manner, the video data 336 may be broadcast to any number of subscriber devices capable of displaying video at any number of resolutions.

In a further embodiment, the video distribution database 345 includes a delivery parameter 348 which identifies whether one or more video frames of a video clip file included in the video data 336 is to be pushed to a subscriber or pulled by the subscriber. For example, as shown in FIG. 3A, upon the video data server 340 receiving new video data 336, a processor accesses the video distribution database 345 based on the source of the video data 336 and determines a subscriber "John" has a 640×480 display capability on a wireless communication handset 361 and index frame delivery is specified. The processor then accesses one or more frames (e.g., an I-frame) of the video data 336 at a down-sampled thumbnail size and transmits the frame(s) as an update notify message 352 to the wireless communication handset 361. Upon receipt of the update notify message 352, the wireless communication handset 361 displays the one or more frames depicting the video subject 310 in the view screen 363 at a rate of approximately 1 frame/sec, for example. In response to commands accessed in a view control window 367, the wireless communication handset 361 may then pull the video data 336 at a full maximum display resolution by issuing a video request 354 to the video data server 340. For example, selection of the "play" view control command 365 while the video subject 310 is displayed in the view screen 363 pulls the video data 336 (e.g., a full video clip file) associated with that index frame from the video data server 340. The full video clip file may then be sent from the video data server 340 to the wireless communication handset 361 at a full screen resolution as specified by the resolution identifier 347.

Similarly, according to push protocol, in response to the video data 336 being sent to the video data server 340, a full video clip file may transmitted as the video clip push 366 to subscriber "Dave" at the down-sampled 320×240 display resolution specified in the video distribution database 345. Upon receiving the video clip push 366, the wireless communication handset 371 displays the full video clip file depicting the video subject 310 in the view screen 373 responsive to the view control soft keys 377.

Figure 3B:
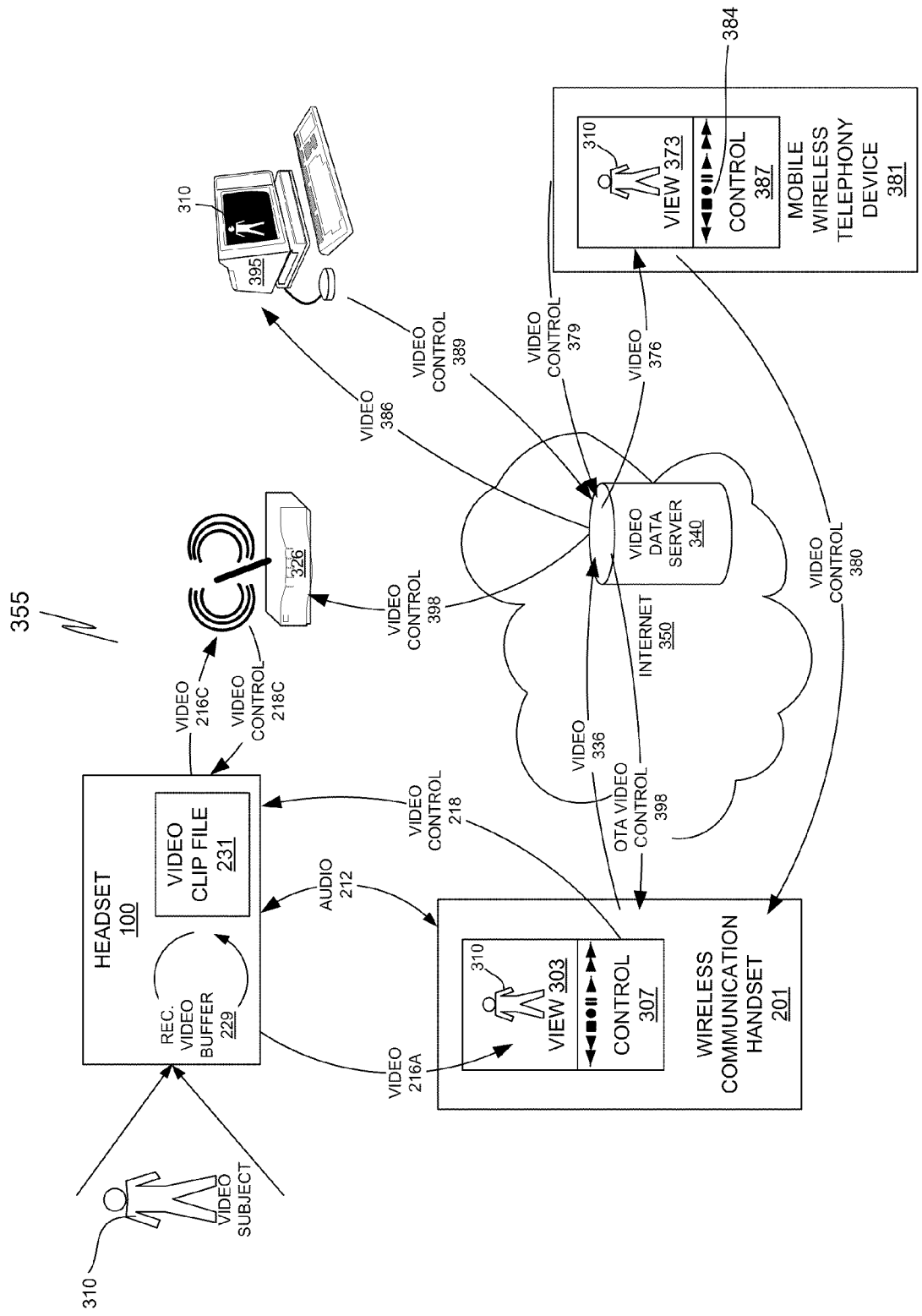
FIG. 3B depicts a communication system including a wireless video recording headset in communication with a wireless communication handset and with video control functions of the headset remotely controlled, in accordance with an embodiment of the present invention.

In an embodiment, the wireless communication handset is to send a video control command to the wireless video recording headset initiating or modifying a video data recording parameter of the headset in response to receiving the video control command via a telecom network. For example, as depicted in FIG. 4, a record enable command may originate at operation 413 and be communicated to the paired handset at operation 412. FIG. 3B depicts a communication system 355 including a wireless video recording headset in communication with a wireless communication handset and with video control functions of the headset remotely controlled by either a personal computing platform 395 or a wireless communication handset 381. Such a remote control feature of the headset 100 may be enabled or disabled by a user (wearer) of the headset 100, as a part of a configuration routine for example. As such, the video camera can be configured to allow specific remote phones or platforms to provide a remote user with any of the video control functions that are available locally to the wearer of the headset 100. The headset 100 is configurable so that a wearer can choose to not share audio and/or video, restrict remote control of various recording functions, such as enabling video streaming and saving clip files on the headset, etc. For certain embodiments which enable remote control features, a third party may either modify video data collection (e.g., enable/disable record) or access previously recorded video via the recorded video data buffer 229. Such capability may be particularly useful when the user of the headset 100 is under the care or charge of the third party. For example, the user of the headset 100 may be an elderly loved one or a nanny whom the third party would like to monitor.

As depicted in FIG. 3B, the video data server 340 may serve as a third party access control point, relaying video control commands from the remote third party portal to the wireless communication handset 201 paired with the headset 100. For example, remote video control commands 389 may be sent from the personal computing platform 395 or remote video control commands 379 may be sent from the wireless communication handset 381 to the video data server 340 in response to actuation of video control soft keys 387 (e.g., the record button 384). In one embodiment, the handset 201 may periodically access the video data server 340 and request a software parameter update from the server in any manner conventional in the art. In response to this update request, the video data server 340 may issue the video control command 398 (responsive to the received command 389 or 379) which is then executed or forwarded by the handset 201 to the headset 100 to process the updated video control command 398.

As further depicted in FIG. 3B, the video data server 340 may serve as a third party access control point, relaying video control commands from the remote third party portal directly to the headset 100 via the wireless-enabled network portal device 326. In this embodiment, the remote video control commands 389, 379 may be relayed as video control commands 398 to the IP address established by the headset 100 in response to an update request issued by the headset 100. The video control command 398 (responsive to the received command 389 or 379) may then be executed by the headset 100 without the control command having to negotiate passage through the handset 201.

In another embodiment, the wireless communication handset 381 may issue an over the air (OTA) video control command 380 which is executable by the wireless communication handset 201. In one such embodiment, the OTA protocol typically utilized for handset software versioning is employed to place an executable video control command 380 on the wireless communication handset 201. Execution of the OTA video control command 380 in turn causes the wireless communication handset 201 to issue the video control command 218A without intervention by the user of the headset 100 (i.e., user of the handset 201).

Depending on the nature of the video control commands 218A, 218C, a headset video record may be enabled or disabled, a clip file 231 saved off from the recorded video data buffer 229 or the recorded video data buffer 229 traversed with one or more index frames or clip file frames sent either to the handset 201 as video data 216A or to the wireless-enabled network portal device 326 as video data 216C, for example depicting the recorded video subject 310. The video data 216A or 216C may then be relayed back to the video data server 340 as the video data 336 or video data 342, respectively, in furtherance of the video control command 398 executed by the wireless communication handset 201. Once the video data 336 or video data 342 is relayed to the video data server 340, it may be forwarded as video data 386 or video data 376 for display by the personal computing platform 395 or wireless communication handset 381, respectively, substantially as described for the communication system 300. Alternatively, the video data 336 may be transmitted directly to the wireless communication handset 381 in response to the OTA video control command 380.

Figure 8:
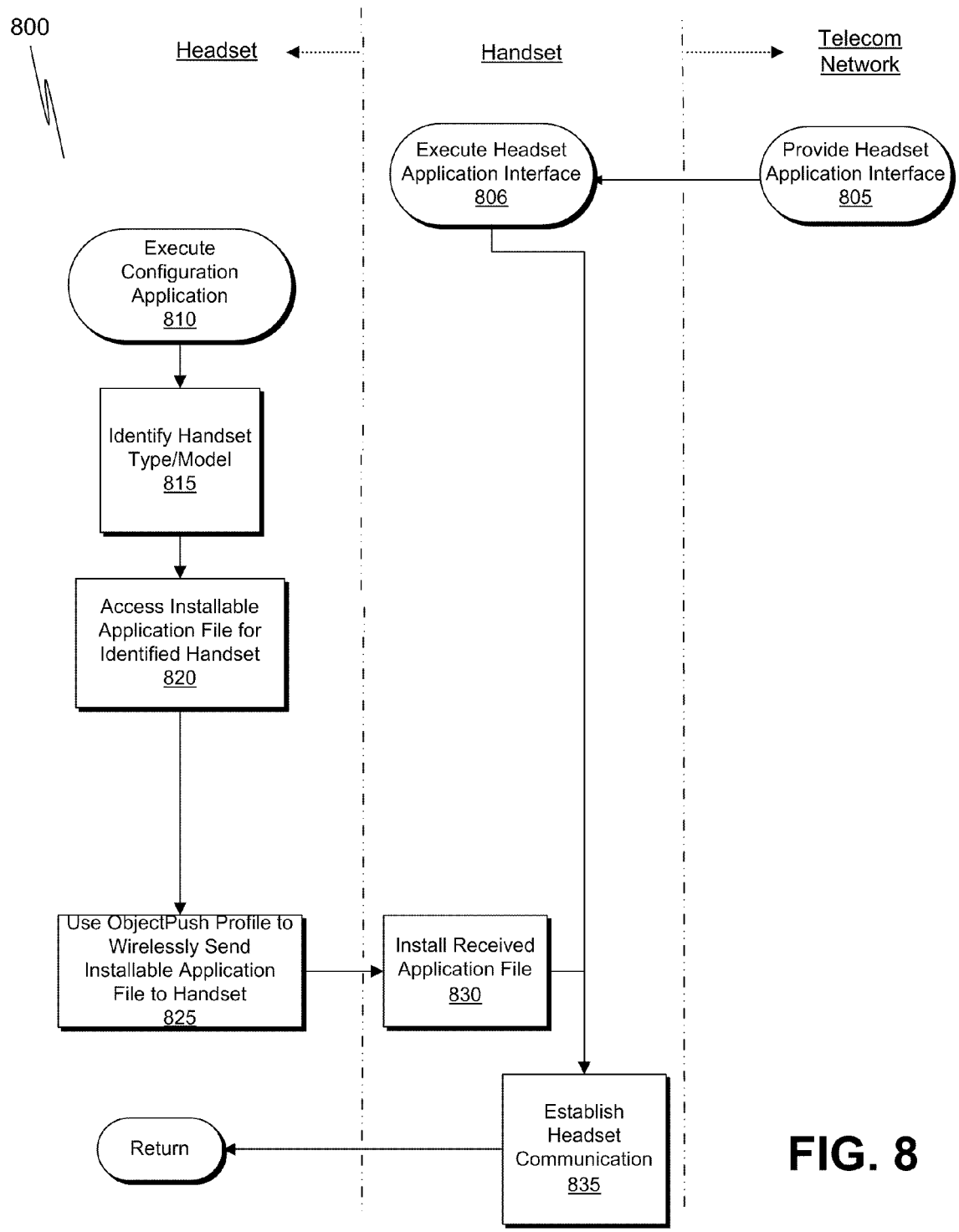
FIG. 8 depicts a flow diagram illustrating a configuration of a wireless communication handset by a wireless video recording headset, in accordance with an embodiment of the present invention.

FIG. 8 depicts a flow diagram illustrating a configuration method 800 for a wireless communication handset by a wireless video recording headset, in accordance with an embodiment of the present invention. In one embodiment, software supporting the headset is installed as part of an OEM handset configuration. In an alternative embodiment, communication service providers, such as cellular carriers (AT&T, Verizon of the United States, British Telecom and Vodafone of the United Kingdom, SK of South Korea, and the like) provide the handset at operation 805 with either a pre-installed application or an OTA software revision and a user may then simply execute the interface application at operation 806 to control a paired headset.

In another embodiment, a user may install application software onto the wireless communication handset using a dataplan provided by a subscribed communication service, or through a data connection between the cell phone and a personal computing platform (e.g., USB port). Because pairing a wireless communication handset may prove to be somewhat more difficult than "plug-and-play," an application interface to a video recording headset may be installed onto a wireless communication handset using the Object Push profile supported by most Bluetooth enabled devices. While the Object Push profile is typically employed for vCard applications, an installation process may take advantage of this capability, for example using the method illustrated in FIG. 8. The headset executes an application (either pre-installed on the headset or acquired through a connection with a personal computer platform) at operation 810. The headset may then identify the type/model of handheld device to which it is being paired at operation 815. The headset may then, at operation 820, access through a communication link with a personal computing platform (e.g., USB connection to a computing platform having internet access), one or more application files for the handset. Next, at operation 825, the headset pushes an installable application file to the wireless communication handset in accordance with an Object Push profile associated with the identified type/model of handset. At operation 830, the user is prompted by the handheld device to install the new application file and the installed application establishes communications with the headset in a normal operational mode at operation 835. The Object Push profile may be utilized to place a customized device driver on the handset to open a specific device port and enable further direct communication with the headset for the purposes of transmitting additional handset application configuration and/or installation data.

What is claimed is:

1. A system comprising:
   a video recording camera comprising:
      an optical sensor through which the video recording camera is to receive an input image signal;
      a processor coupled to the optical sensor, the processor configured to process the input image signal received from the optical sensor into an encoded video data stream;
      a non-volatile storage medium, wherein the storage medium is coupled to the processor and is to store, locally in the video recording camera, the encoded video data stream as recorded video data;
   a video recording data server remote from the video recording camera, the video recording data server comprising a processor to provide third party access to one or more video frames recorded by the video recording camera and stored on a mass storage medium accessible to the video recording data server; and
   a cellular-enabled wireless communication handset communicatively coupled to the video recording camera over a wireless communication link, wherein the wireless communication handset is to access, over the wireless communication link, the video data recorded in the non-volatile storage medium and is to transmit the accessed video data to the video recording data server in response to receiving a video control command from the video recording data server.

2. The system as in claim 1, wherein the video recording data server further comprises a video distribution database keyed to the video recording camera and identifying a third party wireless communication handset as a recorded video data subscriber, and
   wherein the video recording data server is to send the one or more video frames to the third party wireless communication handset.

3. The system as in claim 2, wherein the video distribution database further comprises a video resolution identifier associated with the third party wireless communication handset; and
   wherein the video recording data server is to send the one or more video frames to the third party wireless communication handset at a video resolution based on the video resolution identifier.

4. The system as in claim 1, wherein the video recording data server is to provide third party access to video recording control functions of the video recording camera through a communication link between the video recording camera and the video recording data server.

5. The system as in claim 4, wherein the cellular-enabled wireless communication handset is to activate a video data recording capability of the video recording camera by sending a video control command, received from the video recording data server to the video recording camera.

6. The system as in claim 1, wherein at least a portion of the storage medium provides a circular recorded video data buffer, and wherein the wireless communication handset is to designate a logical segment of the circular recorded video data buffer as a video clip file, the video clip file logically partitioned within the storage medium from the circular buffer such that recorded video data associated with the designated video clip is protected from being overwritten by video data subsequently recorded to the circular buffer.

7. A method of recording video, comprising:
   receiving an input image signal from an optical sensor disposed in a video recording camera; and
   recording an encoded video data stream as video data, based on the received input image signal, to a non-volatile storage medium disposed within the video recording camera
   receiving, with a cellular-enabled wireless communication handset paired to the video recording camera, a video control command from a video recording data server remote from the video recording camera;
   accessing the video data through a wireless communication link between the video recording camera and the cellular-enabled handset and transmitting the accessed video data to the video recording data server; and
   providing, with the video recording data server, third party access to one or more video frames of the video data.

8. The method as in claim 7, wherein the video recording camera includes a first optical sensor connected to a first lens providing a first fixed field of view (FOV) and wherein the video recording camera further comprises a second optical sensor connected to a second lens providing a second FOV, different than the first FOV by at least 20 degrees; and wherein the method further comprises:
   switching, in response to a video control command selecting a FOV, between the first and second optical sensors to provide recorded video data with a switchable FOV.

9. The method as in claim 8, further comprising:
   multiplexing the input image signal received from the first and second optical sensors;
   storing the multiplexed image signals as the recorded video data; and demultiplexing the recorded video data, in response to receiving a video control command selecting a zoom; and partitioning, as a video clip file at the selected zoom, a logical segment of the stored video data.

10. The method of claim 7, further comprising:

providing a circular recorded video data buffer with the nonvolatile storage medium by replacing recorded video data stored in a subset of memory addresses corresponding to a previously recorded video frame with the video data corresponding to a more recently recorded video frame;

designating a logical segment of the circular recorded video data buffer as a video clip file, the video clip file logically partitioned within the storage medium from the circular buffer such that recorded video data associated with the designated video clip is protected from being overwritten by video data subsequently recorded to the circular buffer.

11. The method of claim 7, further comprising:

providing, with the video server, a video distribution database keyed to the video recording camera;

identifying a third party wireless communication handset as a recorded video data subscriber, and sending one or more video frames to the third party wireless communication handset.

12. The method of claim 11, further comprising:

identifying a video resolution associated with the third party wireless communication handset; and sending the one or more video frames to the third party wireless communication handset at a video resolution based on the video resolution identifier.

13. The method of claim 7, further comprising:

receiving a video control command from the video recording data server;

sending the video control command from the cellular-enabled wireless communication handset to the video recording camera, over the wireless communication link, wherein the video command causes the video recording camera to record video data.

* * * * *